(12) United States Patent
Takano

(10) Patent No.: US 12,335,014 B2
(45) Date of Patent: *Jun. 17, 2025

(54) TERMINAL DEVICE, BASE STATION DEVICE, COMMUNICATION METHOD, AND BASE STATION DEVICE CONTROL METHOD

(71) Applicant: Sony Group Corporation, Tokyo (JP)

(72) Inventor: Hiroaki Takano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,556

(22) Filed: Mar. 1, 2024

(65) Prior Publication Data
US 2024/0259075 A1 Aug. 1, 2024

Related U.S. Application Data

(63) Continuation of application No. 17/437,838, filed as application No. PCT/JP2020/012323 on Mar. 19, 2020, now Pat. No. 11,979,215.

(30) Foreign Application Priority Data

Mar. 28, 2019 (JP) ................................. 2019-065082

(51) Int. Cl.
H04B 7/06 (2006.01)
H04B 7/08 (2006.01)
(Continued)

(52) U.S. Cl.
CPC ........... *H04B 7/0695* (2013.01); *H04B 7/088* (2013.01); *H04L 5/005* (2013.01); *H04W 16/28* (2013.01)

(58) Field of Classification Search
None
See application file for complete search history.

(56) References Cited

U.S. PATENT DOCUMENTS 11,979,215 B2 * 5/2024 Takano ................. H04W 16/28
2014/0362812 A1 * 12/2014 Ko ........................ H04L 1/1614
370/329
(Continued)

FOREIGN PATENT DOCUMENTS

CN 106416346 A 2/2017
CN 109391296 A 2/2019
(Continued)

OTHER PUBLICATIONS

Samsung, "UE RX beam set for beam measurement and reporting", R1-1702933, Feb. 13, 2017, 3GPP TSG RAN WG1#88.
(Continued)

*Primary Examiner* — Brian S Roberts
(74) *Attorney, Agent, or Firm* — XSENSUS LLP

(57) ABSTRACT

A terminal device includes a plurality of antenna panels, a reception unit, a selection unit, and a setting unit. The reception unit receives one or more reference signals from a base station via the plurality of antenna panels. The selection unit selects one or more receiving beams from among the received one or more reference signals. The setting unit sets a combination of a receiving antenna panel and the receiving beam to be used by the terminal device when receiving one or more pieces of control information transmitted from the base station (100), based on a combination of the receiving antenna panel and the receiving beam used at the reception of the one or more reference signals.

17 Claims, 22 Drawing Sheets

(51) Int. Cl.
*H04L 5/00* (2006.01)
*H04W 16/28* (2009.01)

(56) References Cited

U.S. PATENT DOCUMENTS

| | | | |
|---|---|---|---|
| 2017/0244467 A1* | 8/2017 | Cho | H04B 7/10 |
| 2018/0048375 A1 | 2/2018 | Guo et al. | |
| 2018/0227094 A1 | 8/2018 | Liu et al. | |
| 2018/0323845 A1* | 11/2018 | Chang | H04L 25/0224 |
| 2018/0331805 A1 | 11/2018 | Xia | |
| 2019/0028167 A1 | 1/2019 | Chang et al. | |
| 2019/0132851 A1 | 5/2019 | Davydov et al. | |
| 2019/0159197 A1 | 5/2019 | Shrestha et al. | |

FOREIGN PATENT DOCUMENTS

| | | |
|---|---|---|
| JP | 2014-524217 A | 9/2014 |
| JP | 2016213902 A | 12/2016 |
| WO | WO-2017038368 A1 | 3/2017 |
| WO | 2018/030811 A1 | 2/2018 |
| WO | 2018/175728 A1 | 9/2018 |
| WO | WO-2018159967 A1 | 9/2018 |

OTHER PUBLICATIONS

International Search Report and Written Opinion mailed on Jun. 16, 2020, received for PCT Application PCT/JP2020/012323, Filed on Mar. 19, 2020, 9 pages.

Sony, "Considerations on Multi-TRP/Panel Transmission", 3GPP TSG RAN WG1 Meeting #96, R1-1902183, Feb. 25-Mar. 1, 2019, 6 pages.

Ericsson: "Further results on beam management without beam indication", 3GPP draft R1-1711020, vol. RAN WG1, No. Qingdao, China; Jun. 17, 2017. XP051305317. retrieved from the Internet: URL:http://www.3gpp.org/ftp/tsg_ran/WG1_RL1/TSGR1_AH/NR_AH_1706/Docs/ [retrieved on Jun. 17, 2017].

NTT Docomo: "Views on beam management details", 3GPP draft R1-1708451, vol. RAN WG1, No. Hangzhou; May 6, 2017, XP051262458, retrieved from the Internet: URL:http://www.3gpp.org/ftp/tsg_ran/WG1_RL1/TSGR1_89/Docs/ [retrieved on May 6, 2017].

* cited by examiner

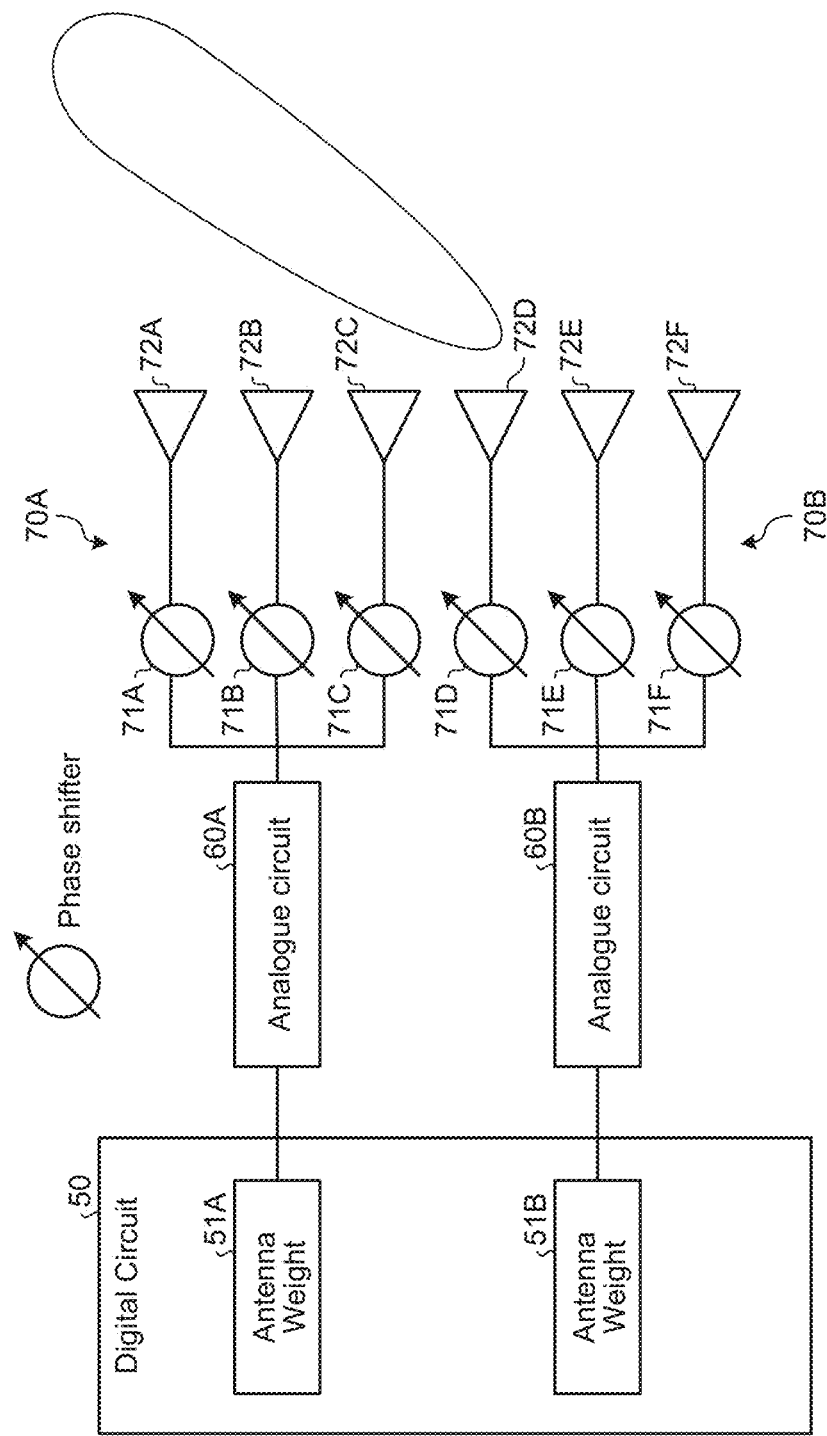

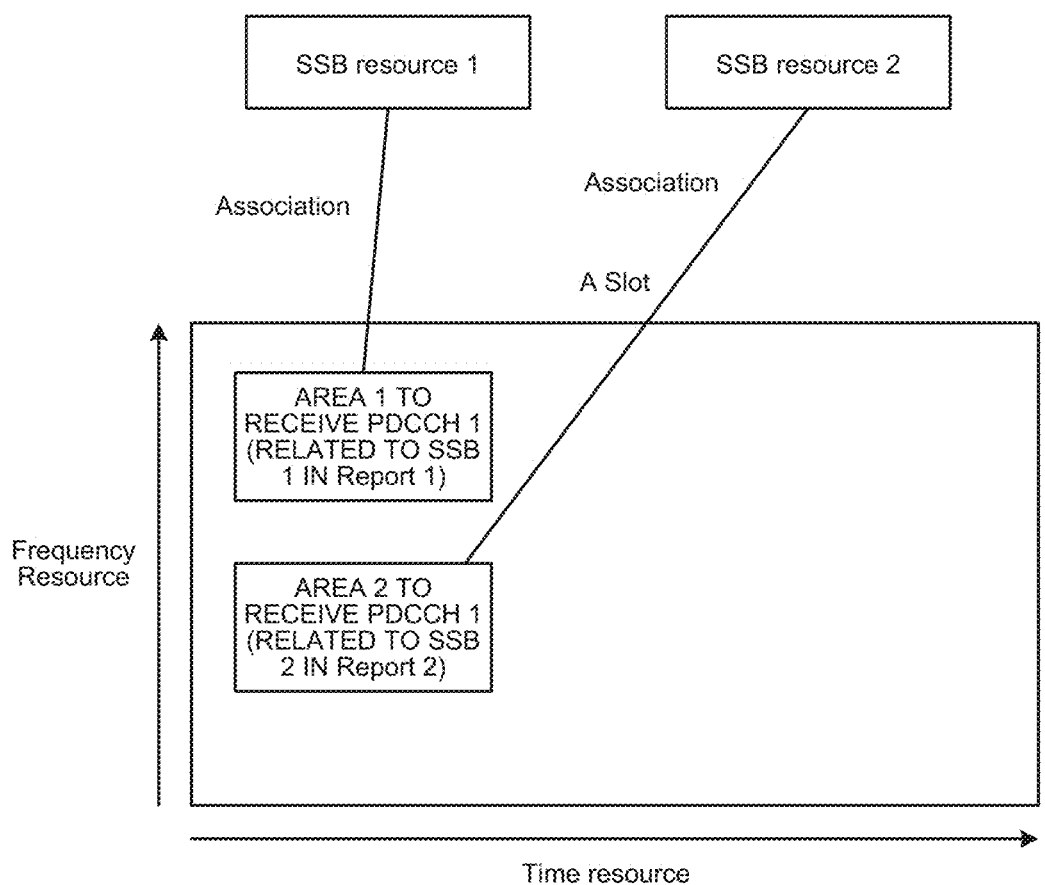

TERMINAL DEVICE, BASE STATION DEVICE, COMMUNICATION METHOD, AND BASE STATION DEVICE CONTROL METHOD

CROSS-REFERENCE TO RELATED APPLICATIONS

The present application is a continuation of U.S. application Ser. No. 17/437,838 filed Sep. 10, 2021, which is based on PCT filing PCT/JP2020/012323, filed Mar. 19, 2020, which claims priority to JP 2019-065082, filed Mar. 28, 2019, the entire contents of each are incorporated herein by reference.

FIELD

The present disclosure relates to a terminal device, a base station device, a communication method, and a base station device control method.

BACKGROUND

Various radio access methods and radio networks in cellular mobile communications (hereinafter, also referred to as "Long Term Evolution (LTE)", "LTE-Advanced (LTE-A)", "LTE-Advanced Pro (LTE-A Pro)", "Fifth generation (5G)", "New Radio (NR)", "New Radio Access Technology (NRAT)", "Evolved Universal Terrestrial Radio Access (EUTRA)", or "Further EUTRA (FEUTRA)") are under examination in 3rd Generation Partnership Project (3GPP). In the following description, LTE includes LTE-A, LTE-A Pro, and EUTRA, and NR includes NRAT and FEUTRA. In LTE and NR, a base station device (base station) is also referred to as an evolved Node B (eNodeB) in LTE and referred to as gNodeB in NR, while a terminal device (mobile station, mobile station device, or terminal) is also referred to as User Equipment (UE). LTE and NR are cellular communication systems that arrange a plurality of areas covered by the base station, as cellular areas. A single base station may manage a plurality of cells.

For example, Patent Literature 1 discloses frames for communicating using beamforming in a radio communication system using a plurality of beamforming antennas.

CITATION LIST

Patent Literature

Patent Literature 1: JP 2014-524217 A

SUMMARY

Technical Problem

Meanwhile, when a terminal has a plurality of receiving antenna panels, the radio quality (e.g. channel quality) between the base station and the terminal might differ depending on the combination of the receiving antenna panel, the receiving beam, or the like used by the terminal. Therefore, when the terminal receives a signal from the base station, it would be desirable to have the base station designate a combination of a receiving antenna panel, a receiving beam, or the like, to be used by the terminal. In this case, there is a need to set a default combination of the receiving antenna panel, the receiving beam, or the like in case there is no designation regarding the combination of the receiving antenna panel, the receiving beam, or the like from the base station.

In view of this, the present disclosure proposes a terminal device, a base station device, a communication method, and a base station device control method capable of contributing to an appropriate setting of a default combination of a receiving antenna panel, a receiving beam, or the like.

Solution to Problem

A terminal device according to the present embodiment includes the plurality of antenna panels, a reception unit, a selection unit, and a setting unit. The reception unit receives one or a plurality of reference signals from the base station via the plurality of antenna panels. The selection unit selects one or more receiving beams from among the received one or more reference signals. The setting unit sets the combination of the receiving antenna panel and the receiving beam used by the terminal device when receiving one or more pieces of control information transmitted from the base station, based on the combination of the receiving antenna panel and the receiving beam used in the reception of the one or more reference signals.

BRIEF DESCRIPTION OF DRAWINGS

FIG. 6A is a diagram illustrating an example of an analogue-digital hybrid antenna architecture.

FIG. 12C is a diagram illustrating resource areas set for a terminal.

DESCRIPTION OF EMBODIMENTS

Figure 1:
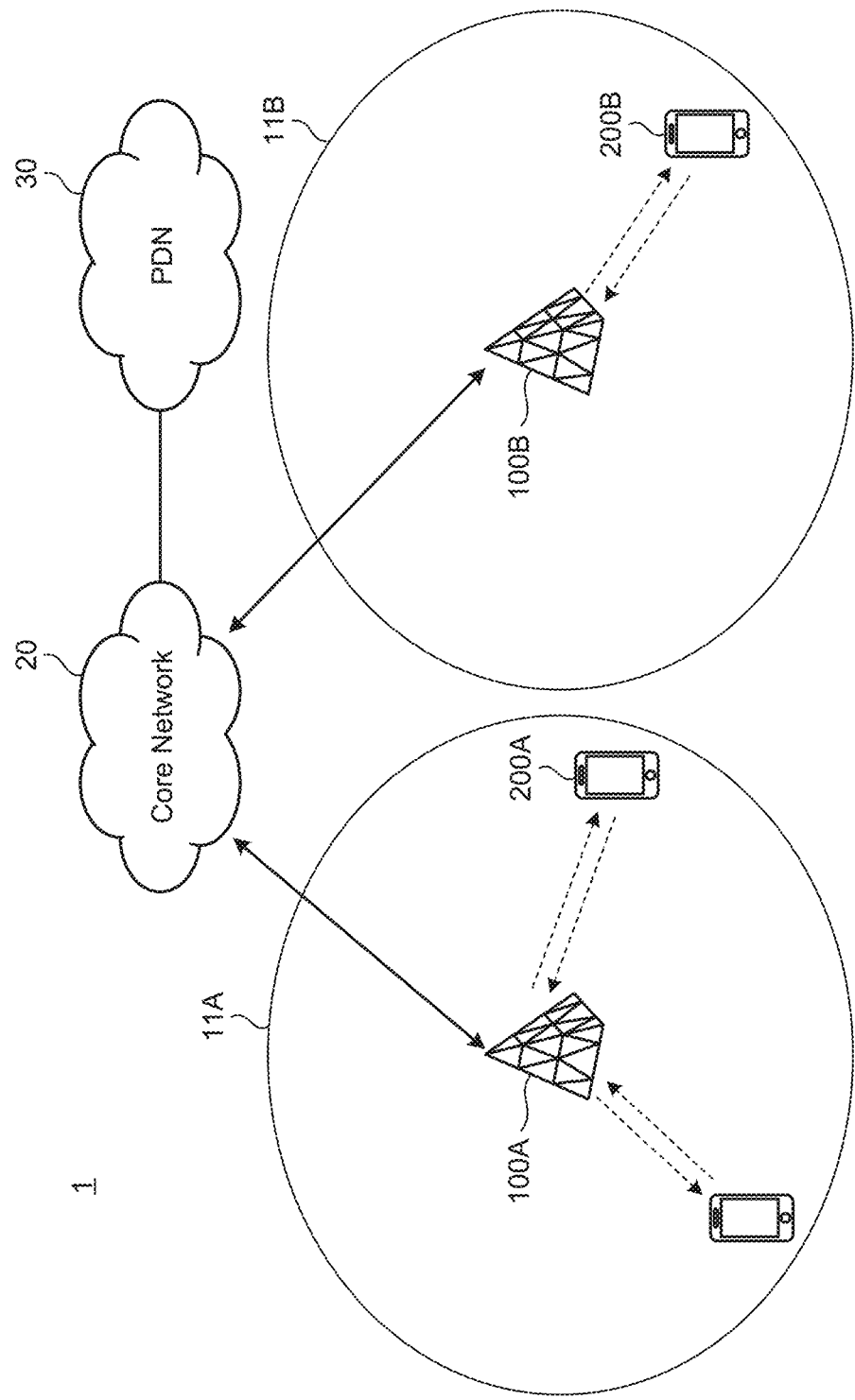
FIG. 1 is a diagram illustrating an example of an entire configuration of a communication system according to an embodiment of the present disclosure.

Embodiments of the present disclosure will be described below in detail with reference to the drawings. In each of the following embodiments, the same parts are denoted by the same reference numerals, and a repetitive description thereof will be omitted.

Moreover, in the present specification and the drawings, a plurality of components having substantially the same functional configuration will be distinguished by attaching different numbers after the same reference numerals. However, when it is not particularly necessary to distinguish between the plurality of components having substantially the same functional configuration, only the same reference numeral is given.

The present disclosure will be described in the following order.
1. Introduction
1.1. System configuration
1.2. Related technologies
1.3. Outline of proposed technology
2. Configuration examples
2.1. Configuration example of base station
2.2. Configuration example of terminal device
3. Embodiments
3.1. Default setting of resource area in PDCCH
3.2. Default setting of resource area in PDSCH
4. Application examples
4.1. Application examples related to base station
4.2. Application examples related to terminal devices
5. Modifications
6. Summary

1. Introduction

1.1. System Configuration

FIG. 1 is a diagram illustrating an example of an entire configuration of a communication system 1 according to an embodiment of the present disclosure. As illustrated in FIG. 1, the communication system 1 includes base stations 100 (100A and 100B), terminal devices 200 (200A and 200B), a core network 20, and a packet data network (PDN) (or simply referred to as data network (DN)) 30.

The base station 100 is a base station device installed in a base station, which is a communication device that manages cells 11 (11A and 11B) and provides radio services to one or more terminal devices located inside the cell 11. For example, the base station 100A provides a radio service to the terminal device 200A, while the base station 100B provides a radio service to the terminal device 200B. The cell 11 can be managed according to a certain radio communication system such as LTE or New Radio (NR). The base station 100 may be any of eNodeB, ng-eNodeB, gNodeB, or en-gNodeB. In addition to or instead of this, the base station 100 may be referred to as EUTRAN when the base station 100 is either eNodeB or en-gNodeB. In addition to or instead of this, the base station 100 may be referred to as NGRAN when the base station 100 is either gNodeB or ng-eNodeB. The base station 100 is connected to the core network 20. The core network 20 is connected to the PDN 30.

When working as an EPC in LTE, for example, the core network 20 can include Mobility Management Entity (MME), Serving gateway (S-GW), PDN gateway (P-GW), Policy and Charging Rule Function (PCRF), and Home Subscriber Server (HSS). The MME is a control node that handles control plane signals and manages the moving state of the terminal device. The S-GW is a control node that handles user plane signals and is implemented as a gateway device that switches user information transfer routing. The P-GW is a control node that handles user plane signals and implemented as a gateway device that makes a connection point between the core network 20 and the PDN 30. The PCRF is a control node that controls policies such as Quality of Service (QOS) for bearers and billing. The HSS is a control node that handles subscriber data and controls services. Meanwhile, when working as a 5GC in NR, the core network 20 can include Access and mobility Management Function (AMF), Session Management Function (SMF), User-Plane Function (UPF), Policy Control Function (PCF), and Unified Data Management (UDM). The AMF is a control node that handles control plane signals and manages the moving state of the terminal device. The SMF is a control node that handles control plane signals and manages data transfer routing. The UPF is a control node that handles user plane signals and manages user information transfer routing. The PCF is a control node that controls policies. The UDM is a control node that handles subscriber data.

The terminal device 200 is a communication device that performs radio communication with the base station 100 under the control of the base station 100. The terminal device 200 may be a terminal referred to as User Equipment (UE). For example, the terminal device 200 transmits an uplink signal to the base station 100 and transmits a downlink signal from the base station 100.

1.2. Related Technologies (1) Bandwidth Part (BWP)

Figure 2:
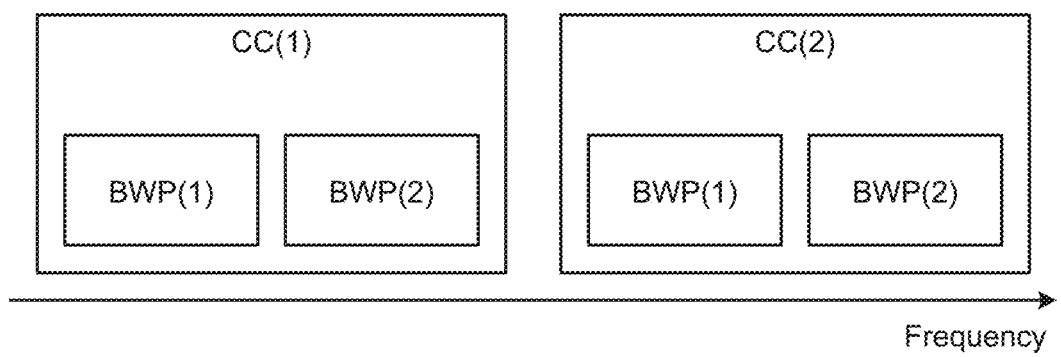
FIG. 2 is a diagram illustrating BWP.

FIG. 2 is a diagram illustrating a BWP. In the example of FIG. 2, Component Carrier (CC) #1 contains a plurality of BWPs (#1 and #2), and CC #2 contains a plurality of BWPs (#1 and #2). In the present specification, the number following the mark # represents an index (or an identifier). The BWPs contained in different CCs represent different BWPs even with an identical index. The BWP is obtained by dividing the CC, which is one operation band width, into a plurality of frequency bandwidths. In each of the BWPs, different Subcarrier spacings (e.g. Numerology) can be set. Note that one CC may include a Downlink Component Carrier and an Uplink Component Carrier, or may be either a Downlink Component Carrier or an Uplink Component Carrier. Moreover, one CC may correspond to one cell. That is, a plurality of BWPs may be included in one cell.

This BWP has been standardized in the NR feature of 3GPP Rel15. The BWP can also be defined as a subset of the total cell bandwidth regarding one cell. In the Orthogonal Frequency Division Multiplexing (OFDM) modulation method standardized on LTE in Rel8, the subcarrier spacing is fixed at 15 kHz. By contrast, in the NR feature of Rel15, the subcarrier spacing can be set to 15 kHz, 30 kHz, 60 kHz, 120 kHz, or 240 kHz. The longer the subcarrier spacing, the shorter the OFDM symbol length. For example, the subcarrier spacing is 15 kHz in LTE, which has enabled transmission of two slots per 1 ms (millisecond) (i.e. 1 subframe), in other words, enabling transmission of 14 OFDM symbols. By contrast, in NR, the subcarrier spacing of 60 kHz enables transmission of four slots per 1 ms, while the subcarrier spacing of 120 kHz enables transmission of eight slots per 1 ms, and subcarrier spacing of 240 kHz enables transmission of 16 slots per 1 ms. In this manner, extending the subcarrier would shorten the OFDM symbol length. This makes it possible to provide a frame configuration suitable for low-latency communication.

The NR makes it possible to set the BWPs with different subcarrier spacing settings to the terminal at the same time. Accordingly, the NR can provide a plurality of BWPs for different use cases at the same time.

(2) Number of Active BWPs

The BWP that can be used for transmission and reception is also referred to as an active BWP. In 3GPP, the active BWP is also defined as a UE operating bandwidth within a cell operating bandwidth. The number of BWPs that the base station 100 can transmit and receive at the same time is also referred to as the number of active BWPs. The number of active BWPs of the base station 100 may be plural. In contrast, the number of active BWPs of the terminal device 200 is one in the case of the UE of 3GPP Rel. 15. However, in the present specification, the number of active BWPs of the terminal device 200 may be plural. In the technique according to the present disclosure, the number of active BWPs of the terminal device 200 is assumed to be one.

(3) Relationship Between Cell (or CC), Carrier, and BWP

In the present disclosure, a plurality of cells may be allowed to overlap each other in the frequency direction in one carrier. For example, a plurality of Synchronization Signal/PBCH blocks (SSBs) may be transmitted at a plurality of frequency spans in one carrier. However, from the viewpoint of UE (that is, the terminal device 200), each of cells (serving cells) is associated with at most one SSB (that is, a Cell-defining SSB). The UE (terminal device 200) uses the BWP associated with the Cell-defining SSB as an Initial BWP. Furthermore, the UE (terminal device 200) may use a Dedicated BWP constituted with one or more frequency spans in the same carrier as the Initial BWP, in addition to the Initial BWP. From a UE (terminal device 200) perspective, the Initial BWP and the additional Dedicated BWP are associated with one cell. The present embodiment may include a case where the terminal device 200 uses a plurality of BWPs at the same time point.

(4) Codebook Based Beamforming

With beamforming performed in communicating with the terminal device 200, the base station 100 can improve the communication quality, for example. Beamforming methods include a method of generating a beam that tracks the terminal device 200 and a method of selecting a beam that tracks the terminal device 200 from among candidate beams. The former method might not be adopted in cellular radio communication systems (for example, 5G) because of the computational cost of generating a beam each time. By contrast, the latter method is adopted in Full Dimension Multiple Input Multiple Output (FD-MIMO) in Release 13 of Third Generation Partnership Project (3GPP). The latter method is also referred to as codebook based beamforming.

In the codebook based beamforming, the base station 100 prepares (that is, generates) beams in all directions in advance, and selects the beam suitable for the target terminal device 200 from among the prepared beams so as to communicate with the terminal device 200 using the selected beam. For example, when capable of communicating in 360 degrees in the horizontal direction, for example, the base station 100 prepares 360 types of beams in increments of 1 degree. When allowing the beams to be half overlapped with each other, the base station 100 prepares 720 types of beams. In the vertical direction, the base station 100 prepares a beam for 180 degrees ranging from −90 degrees to +90 degrees, for example.

The terminal device 200 only monitors the beam, and thus, has no high need for grasping the existence of the codebook on the base station 100 side.

In the following, a plurality of beams prepared in advance by the base station 100 is also referred to as a beam group. The beam group can be defined for each of frequency bands, for example. The beam group can also be defined for each of Rx/Tx beams, or for each of downlinks/uplinks. The plurality of beams prepared or managed by the base station 100 may be associated with one cell (i.e. the plurality of beams may constitute one cell). Alternatively, the plurality of beams prepared or managed by the base station 100 may be associated with a plurality of cells (i.e. the plurality of beams may constitute a plurality of cells).

(5) Beam Sweeping

In the NR, in order to select the optimum beam to be used for communication, beam sweeping, which transmits or receives a measurement signal (known signal) by using each of a plurality of beams belonging to a beam group, has been examined. The measurement signal is also referred to as a reference signal in some cases. When the measurement signal is a downlink signal, the measurement signal may include Synchronization Signal block (SSB)/Physical Broadcast Channel (PBCH) block, or Channel State Information-Reference Signal (CSI-RS). Based on the measurement result of the measurement signal (i.e. measurement signal of each of beams) transmitted from the base station with beam sweeping, the terminal can select the optimum transmission-oriented beam (hereinafter, also referred to as a transmitting beam). An example of this will be described with reference to FIG. 3.

Figure 3:
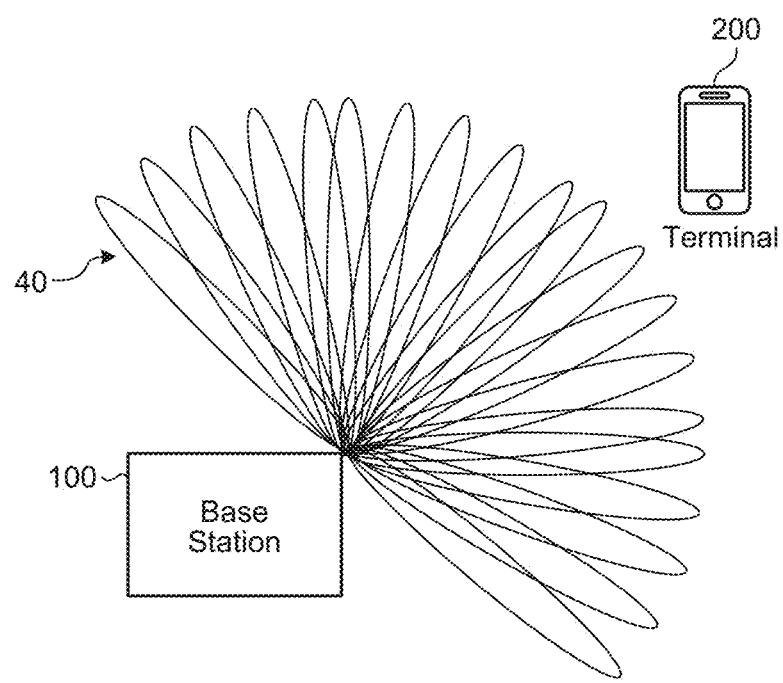
FIG. 3 is a diagram illustrating beam sweeping.

FIG. 3 is a diagram illustrating beam sweeping. In an example illustrated in FIG. 3, the base station 100 transmits a measurement signal with beam sweeping (that is, switching the transmitting beam) using the beam group 40. In addition, transmission with beam sweeping is also referred to as beam sweeping transmission below. Thereafter, the terminal device 200 measures the measurement signal obtained by beam sweeping transmission and determines which of the transmitting beams is most likely to be received. In this manner, the optimum transmitting beam of the base station 100 for the terminal device 200 is selected. By exchanging the base station 100 and the terminal device 200 and executing the similar procedure, the base station 100 can select the optimum transmitting beam of the terminal device 200.

On the other hand, the optimum reception-oriented beam (hereinafter, also referred to as a receiving beam, or a beam) can be selected based on the measurement result obtained by receiving the measurement signal with beam sweeping. For example, the terminal device 200 transmits a measurement signal by an uplink. Thereafter, the base station 100 receives the measurement signal with beam sweeping (that is, switching the receiving beams), and determines which of the receiving beams is most likely to be received. In this manner, the optimum receiving beam of the base station 100 is selected. By exchanging the base station 100 and the terminal device 200 and executing the similar procedure, the terminal device 200 can select the optimum receiving beam of the terminal device 200. In addition, reception with beam sweeping is also referred to as beam sweeping reception below.

The reception and measurement side of a measurement signal transmitted by beam sweeping transmission reports the measurement result to the transmitting side of the measurement signal. The measurement result may include information indicating which of the transmitting beams is optimal (e.g. beam identifier, time, preamble, or the like). The optimum transmitting beam is a transmitting beam having the highest reception power, for example. The measurement result may include information indicating one transmitting beam having the highest reception power, or may include information indicating the top K transmitting beams in order from the one having the highest reception power. The measurement result includes, for example, identification information of the transmitting beam (for example, the index of the beam) and information indicating the magnitude of the reception power of the transmitting beam (for example, Reference Signal Received Power (RSRP)) in association with each other.

The beam used in beam sweeping is transmitted by giving directivity to the reference signal which is a known signal. Therefore, the terminal device 200 can discriminate the beam by using a resource being a reference signal.

The base station 100 can provide one beam using the resource of one reference signal. That is, with preparation of ten resources, the base station 100 can perform beam sweeping corresponding to ten different directions. Ten resources can be collectively referred to as a resource set. One resource set formed with ten resources can provide beam sweeping corresponding to ten directions.

(6) CSI Acquisition Procedure

A Channel State Information (CSI) acquisition procedure is executed after the optimum beam selection performed by the beam selection procedure including the beam sweeping described above. The CSI acquisition procedure acquires the channel quality in communication using the selected beam. For example, the CSI acquisition procedure includes acquisition of a Channel Quality Indicator (CQI).

Channel Quality is Used to Determine communication parameters such as modulation methods. Adoption of a modulation method capable of transmitting only a few bits even with good channel quality, for example, Quadrature Phase Shift Keying (QPSK), would cause a low throughput. On the other hand, adoption of a modulation method capable of transmitting a large amount of bits, such as 256 Quadrature Amplitude Modulation (QAM) even with poor channel quality would lead to a failure in data reception (i.e. decoding) on the receiving side, resulting in a low throughput as well. In this manner, proper acquisition of channel quality is important in order to improve the throughput.

Figure 4:
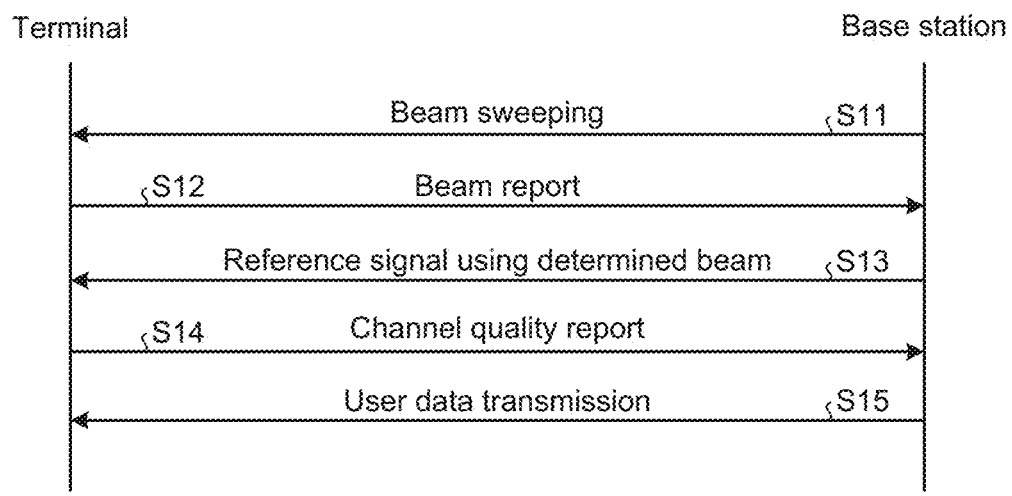
FIG. 4 is a sequence diagram illustrating an example of a flow of a typical beam selection procedure and CSI acquisition procedure executed by a base station and a terminal device.

FIG. 4 is a sequence diagram illustrating an example of a flow of a typical beam selection procedure and a CSI acquisition procedure executed by a base station and a terminal device. As illustrated in FIG. 4, the base station uses beam sweeping to transmit a measurement signal (e.g. SSB) for beam selection (step S11). Next, the terminal device measures the measurement signal for beam selection and reports a beam measurement result (beam report) to the base station (step S12). The measurement result includes, for example, information (e.g. index associated with the best beam) indicating the selection result of the optimum transmitting beam of the base station. The base station then transmits a measurement signal (e.g. CSI-RS) for channel quality acquisition using the selected optimum beam (step S13). Next, the terminal device reports the acquired channel quality to the base station based on the measurement result of the measurement signal (step S14). Thereafter, the base station transmits user information to the terminal device by using the communication parameters based on the reported channel quality (step S15). From the above, a beam report, which includes the measurement result of the measurement signal for beam selection received by the base station or the terminal, is transmitted to the terminal or the base station.

Downlink channel quality is measured based on the measurement signal transmitted over the downlink. Additionally, downlink channel quality can also be measured based on the measurement signal transmitted over the uplink. This is because the uplink channels and the downlink channels have reversibility, and have basically the same channel quality. Such reversibility is also referred to as channel reciprocity.

When measuring the downlink channel quality based on the downlink measurement signal, the measurement result of the measurement signal for channel quality acquisition is reported as illustrated in step S14 of FIG. 4. Reporting this measurement result can be a significant amount of overhead. A channel can be represented by an N×M matrix when the number of transmitting antennas is M and the number of receiving antennas is N. Each of elements of the matrix is a complex number corresponding to IQ. For example, in a case where each I/Q is represented by 10 bits, the number of transmitting antennas is 100, and the number of receiving antennas is eight, the report of the channel quality measurement result would use 8×100×2×10=16000 bits, which would be a significant amount of overhead.

In comparison, when measuring the downlink channel quality based on the uplink measurement signal, it is not necessary to report the measurement result because the measurement subject is the base station. Therefore, by measuring the downlink channel quality based on the uplink measurement signal, it is possible to reduce the overhead related to reporting the measurement result and improve the throughput. The flow of process in measuring the channel quality of the downlink based on the uplink measurement signal will be described with reference to FIG. 5.

Figure 5:
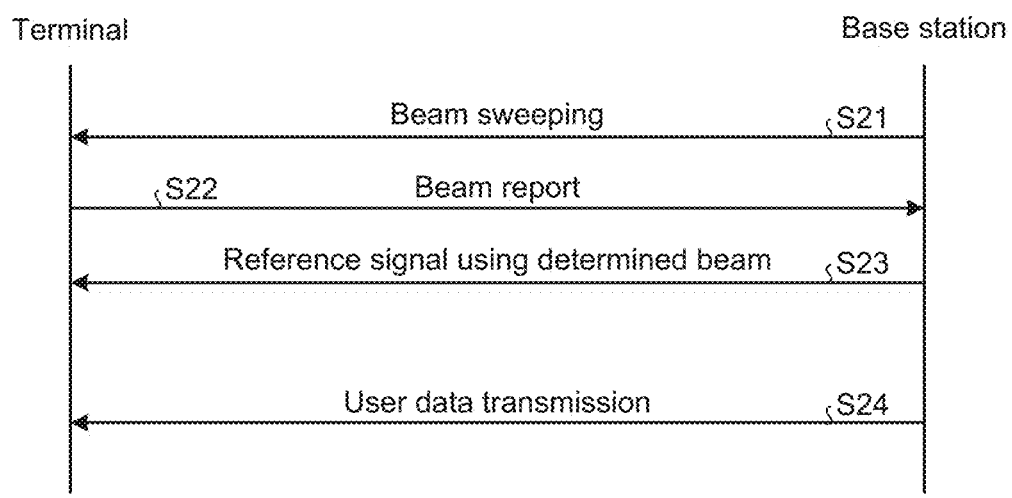
FIG. 5 is a sequence diagram illustrating another example of a flow of a typical beam selection procedure and CSI acquisition procedure executed by a base station and a terminal device.

FIG. 5 is a sequence diagram illustrating another example of a flow of a typical beam selection procedure and CSI acquisition procedure executed by a base station and a terminal device. As illustrated in FIG. 5, the terminal device transmits the measurement signal for beam selection by using beam sweeping transmission, and the base station receives the measurement signal by using beam sweeping (step S21). At that time, the base station selects the optimum transmitting beam of the terminal device and the optimum receiving beam of the base station based on the measurement result. Next, the base station reports the beam measurement result (beam report) to the terminal device (step S22). Such measurement result includes information indicating the selection result of the optimum transmitting beam of the terminal device. Next, the terminal device transmits a measurement signal for channel quality acquisition by using the selected transmitting beam (step S23). The base station acquires uplink channel quality based on the measurement result, and acquires downlink channel quality based on the uplink channel quality. Thereafter, the base station transmits user information to the terminal device using the communication parameters based on the acquired downlink channel quality (step S24). From the above, a beam report, which includes the measurement result of the measurement signal for beam selection received by the base station or the terminal, is transmitted to the terminal or the base station.

(7) Analogue-Digital Hybrid Antenna Architecture

In order to control the directivity of the antenna, there is an assumable architecture in which all processes are performed by an analogue circuit. Such an architecture is also referred to as a fully digital architecture. In a fully digital architecture, antenna weights as many as antennas (that is, antenna elements) are applied in a digital domain (that is, by a digital circuit) to control the directivity of the antenna. The antenna weight is a weight for controlling the amplitude and phase. Unfortunately, however, the fully digital architecture has a drawback of enlargement of the digital circuit. Examples of an architecture to overcome such a drawback of the fully digital architecture include an analogue-digital hybrid antenna architecture.

FIG. 6A is a diagram illustrating an example of an analogue-digital hybrid antenna architecture. The architecture illustrated in FIG. 6A includes a digital circuit 50, analogue circuits 60 (60A and 60B), and antenna panels 70 (70A and 70B). The digital circuit can apply a plurality of antenna weights 51 (51A and 51B). The analogue circuit 60 and the antenna panel 70 are provided in the same number as the number of antenna weights 51 applicable to the digital circuit 50. The antenna panel 70 includes a plurality of antennas 72 (72A to 72F) and phase shifters 71 (71A to 71F) as many as the number of antennas 72. The phase shifter 71 is a device that applies an antenna weight that can control the phase alone in an analogue domain.

The characteristics of the antenna weight in the digital domain and the antenna weight in the analogue domain are illustrated in Table 1 below.

TABLE 1

|  | Analogue domain | Digital domain |
| --- | --- | --- |
| Controllable target | Phase | Amplitude and phase |
| Analogue or digital | Analogue | Digital |
| Arrangement position: time domain or frequency domain | Time domain | Frequency domain when OFDM modulation method is used and when arrangement is performed on FFT/IFFT back/front on receiving side/transmitting side |
| Is it possible to provide different beams in different frequencies in same time | Impossible | Possible |

TABLE 1-continued

|  | Analogue domain | Digital domain |
| --- | --- | --- |
| Is it possible to provide different beams in same frequency in same time | Impossible | Possible |

Antenna weights in the digital domain are applied in a frequency domain when OFDM modulation method is used. For example, the antenna weight in the digital domain is applied before Inverse Fast Fourier Transform (IFFT) at the time of transmission and applied after Fast Fourier Transform (FFT) at the time of reception.

Antenna weights in the digital domain are applied in the frequency domain. Therefore, by applying the antenna weights in the digital domain, it is possible to transmit a beam in different directions using different frequency resources even when the time resources are the same. On the other hand, the antenna weights in the analogue domain are applied in a time domain. Therefore, even when the antenna weight in the analogue domain is applied, the beam can be directed only in the same direction over all frequency resources with the same time resource.

That is, each of the antenna panels 70 can transmit a beam in different directions using different frequency resources even with the same time resource. On the other hand, one antenna panel 70 can direct the beam in only one direction using the same time resource and frequency resource. Therefore, in the analogue-digital hybrid antenna architecture, the number of directions of the beam that can be transmitted and received in the same time resource corresponds to the number of antenna panels 70. Furthermore, in the analogue-digital hybrid antenna architecture, the number of beam groups that be handled by beam sweeping transmission or beam sweeping reception in the same time resource corresponds to the number of antenna panels 70.

Such an analogue-digital hybrid antenna architecture can be adopted in both the base station 100 and the terminal device 200.

(8) Antenna Panel

In FIG. 6A, three analogue domain phase shifters are connected to one digital domain weight. The one digital domain weight and the three analogue domain phase shifters can be arranged as a set as an antenna panel. FIG. 6A illustrates an example in which two antenna panels are provided, each of the antenna panels being formed with three antenna elements. As illustrated in Table 1, usually it would not possible, with one panel, to form beams in different directions at the same time using different frequencies. However, it is possible, with two panels, to form beams in different directions, even at the same time. This antenna panel configuration is used on both the base station side and the terminal side.

Figure 6B:
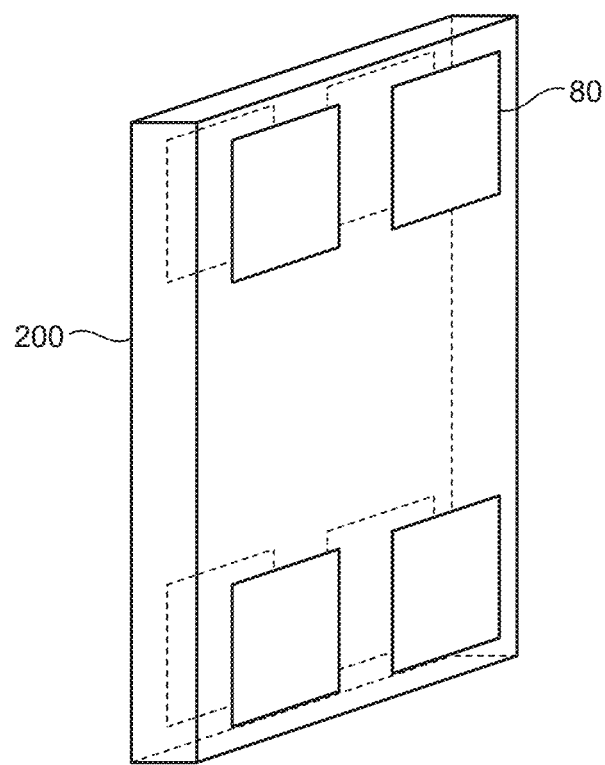
FIG. 6B is a diagram illustrating an example of arranging eight antenna panels in a terminal device.

FIG. 6B is a diagram illustrating an example of arranging eight antenna panels in the terminal device 200. FIG. 6B illustrates an example of arranging a total of eight antenna panels, specifically four on front surface and four on back surface of the terminal device 200. The number of antenna elements mounted on one antenna panel is not limited to a specific number. Still, four antenna elements are mounted on one antenna panel, for example. Since the four antenna panels arranged on the front surface, or the four antenna panels arranged on the back surface, are arranged so as to face the same direction, the panels here are referred to as coherent antenna panels. In contrast, the antenna panels on the front surface and the antenna panels on the back surface are referred to as non-coherent antenna panels.

(9) Reference Signal and User Information Resource

In order to implement beam sweeping and the CSI acquisition procedure, it is necessary to transmit and receive the reference signal between the base station device 100 and the terminal device 200. Furthermore, when the user information is transmitted and received between the base station device 100 and the terminal device 200, it is also necessary to transmit and receive the reference signal. These reference signals are basically designated by frequency and time resources, and include some cases where resources are designated by using orthogonal sequences. In contrast, as for the user information, scheduling information included in the control signal designates the frequency and time resources of the user information. In the case of user information, orthogonal sequences are not to be assigned as resources. Only frequency and time resources are designated.

(10) Selecting Antenna Panel and Beam on the Receiving Side (10-1) Selecting Antenna Panel and Beam at Beam Management Stage During beam management, with trial-and-error (e.g. trial on each combination of the beam and the antenna panel one by one) on the terminal device 200 side on the beam coming from the base station 100, determination is made as to which beam and which antenna panel are to be used for reception. Basically, different antenna panels can operate at the same time. Therefore, when four resource areas in a resource block are set as reference signal resources for the same beam for a downlink beam, the terminal device 200 can use four different receiving beams for each of antenna panels to determine which is the desired receiving beam for the terminal device 200. Such an operation is performed for the number of downlink beams corresponding to different directions on the base station 100 side. When the number of downlink beams is ten, the terminal device 200 monitors the receiving beam using 10×4=40 resources, thereby enabling determination of the desired beam from the base station 100 as well as the antenna panel and the desired beam on the terminal device 200 side. In the present specification, for convenience of explanation, the combination of the receiving antenna panel and the receiving beam used by the terminal for reception is also referred to as a reception environment.

(10-2) Selecting Antenna Panel and Beam at CSI Procedure Stage

The CSI procedure stage is the stage where the base station 100 uses precoding for transmission (finer antenna control) and then confirms the quality of the channel in more detail. At the CSI procedure stage, the reference signal (CSI-RS) for the CSI procedure is received by using the antenna panel of the terminal device 200 identified in the previous beam management stage and using the beam determined to be the most desirable within the antenna panels.

(10-3) Selection of Antenna Panel and Beam at User Information Reception Stage

At the user information reception stage, the terminal device 200 may only be required to receive user information using the antenna panel and the receiving beam determined at the time of beam management, similarly to the CSI procedure stage. However, when there are two beams using such an antenna panel, the terminal device 200 cannot determine how to select the antenna panel and the beam.

Figure 7:
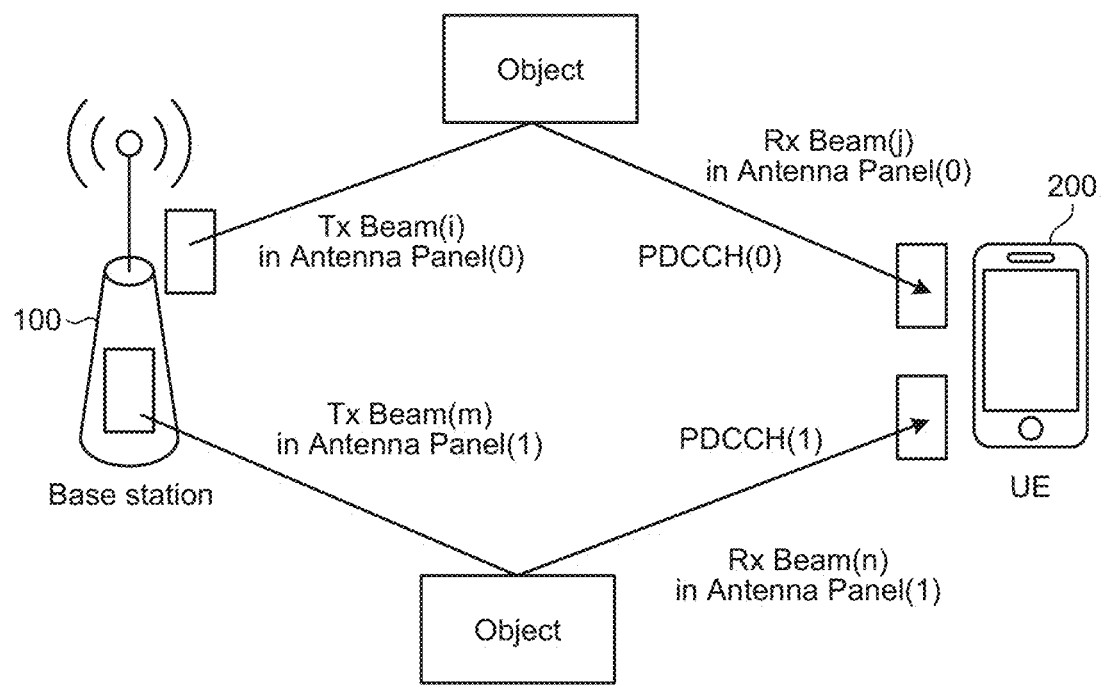
FIG. 7 is a diagram illustrating two beam sets.

FIG. 7 is a diagram illustrating two beam sets. When the terminal device 200 has performed the beam management process twice and has determined the antenna panel and the beam of the terminal device 200 suitable for each of the beams transmitted from the two different antenna panels of the base station 100, there are two beam sets as illustrated in FIG. 7. Specifically, the two beams sets include a first beam set "Beam set (0): transmitting beam (i) in transmitting antenna panel (0)+receiving beam (j) in receiving antenna panel (0)", and a second beam set "Beam set (1): transmitting beam (m) in transmitting antenna panel (1)+receiving beam (n) in receiving antenna panel (1)". The beam set refers to a beam link constituted with a combination of antenna panels and beams on the transmitting side and the receiving side.

Furthermore, since control information (e.g. scheduling information), which is a control signal that designates a resource of user information, is transmitted using a beam, it is important to grasp which beam set is to be used to receive the control information by the terminal device 200. Examples of the control information include a PHY Downlink Control Channel (PDCCH) or Downlink Control Information (DCI) transmitted by the PDCCH.

(10-4) Method of Designating Antenna Panel and Beam Used by Terminal

In FIG. 7, the base station 100 may explicitly or implicitly indicate to the terminal device 200 that reception of the PDCCH (0) is enabled by the receiving beam (j) of the receiving antenna panel (0). A conceivable example of this would be a method of directly designating the receiving antenna panel and the receiving beam of the terminal device 200.

On the other hand, for example, there is an assumable case where the base station 100 has transmitted "Reference Signal A" using the "transmitting beam (i) in the transmitting antenna panel (0)", and the terminal device 200 has received the "Reference Signal A" by using the "receiving beam (j) in the receiving antenna panel (0)". Furthermore, there is an assumable case where the base station 100 has transmitted "Reference Signal B" using the "transmitting beam (m) in the transmitting antenna panel (1)", and the terminal device 200 has received the "Reference Signal B" by using the "receiving beam (n) in the receiving antenna panel (1)". Based on this, before transmission of PDCCH (0), the base station 100 can instruct to use, at the time of receiving the PDCCH (0), the receiving antenna panel and the receiving beam used when receiving "Reference Signal A". In other words, it is possible to implicitly designate an instruction equivalent to the instruction to use the receiving beam (j) in the receiving antenna panel (0).

(10-5) Process with No Designation of Antenna Panel and Beam

In the above, the base station 100 clearly instructed the terminal device 200 to use the same receiving antenna panel and receiving beam as when receiving "Reference Signal A". However, there are cases where there is no instruction from the base station 100 or the setting of the instruction by the base station 100 is not in time, which leads to the necessity of performing a process for such a case. For example, it is conceivable to use the receiving antenna panel and the receiving beam used when the terminal device 200 synchronizes with the base station 100 as a default.

However, when synchronization signals (reference signals) are provided from different antenna panels of the base station 100, it is difficult to determine which antenna panel and beam used in reception of which synchronization signal should be used as the default.

(10-6) Synchronization Signal

Figure 8:
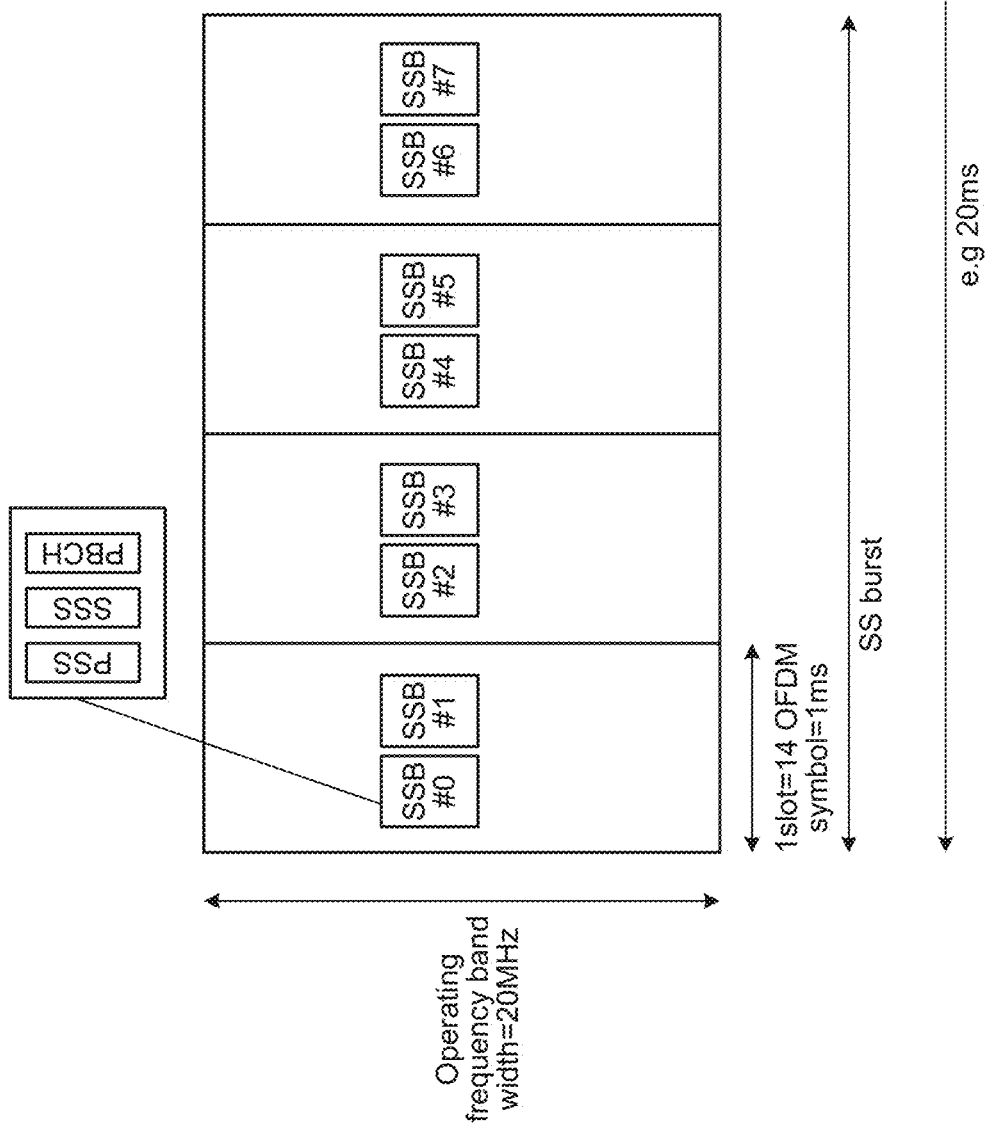
FIG. 8 is a diagram illustrating a synchronization signal.

Here, a synchronization signal will be described. FIG. 8 is a diagram illustrating an example of a synchronization signal. As illustrated in FIG. 8, the synchronization signal is a signal that periodically transmits an SSB burst. The SSB burst includes a plurality of SSBs that has undergone beamforming. The SSB contains a sequence of synchronization signals PSS and SSS and system information referred to as PBCH for broadcast. PSS and SSS are supposed to be used in the same manner as LTE. The base station 100 transmits each of SSBs using beams in different directions. Accordingly, the terminal device 200 receives the SSB facing the direction of the terminal device 200 and performs synchronization.

Figure 9:
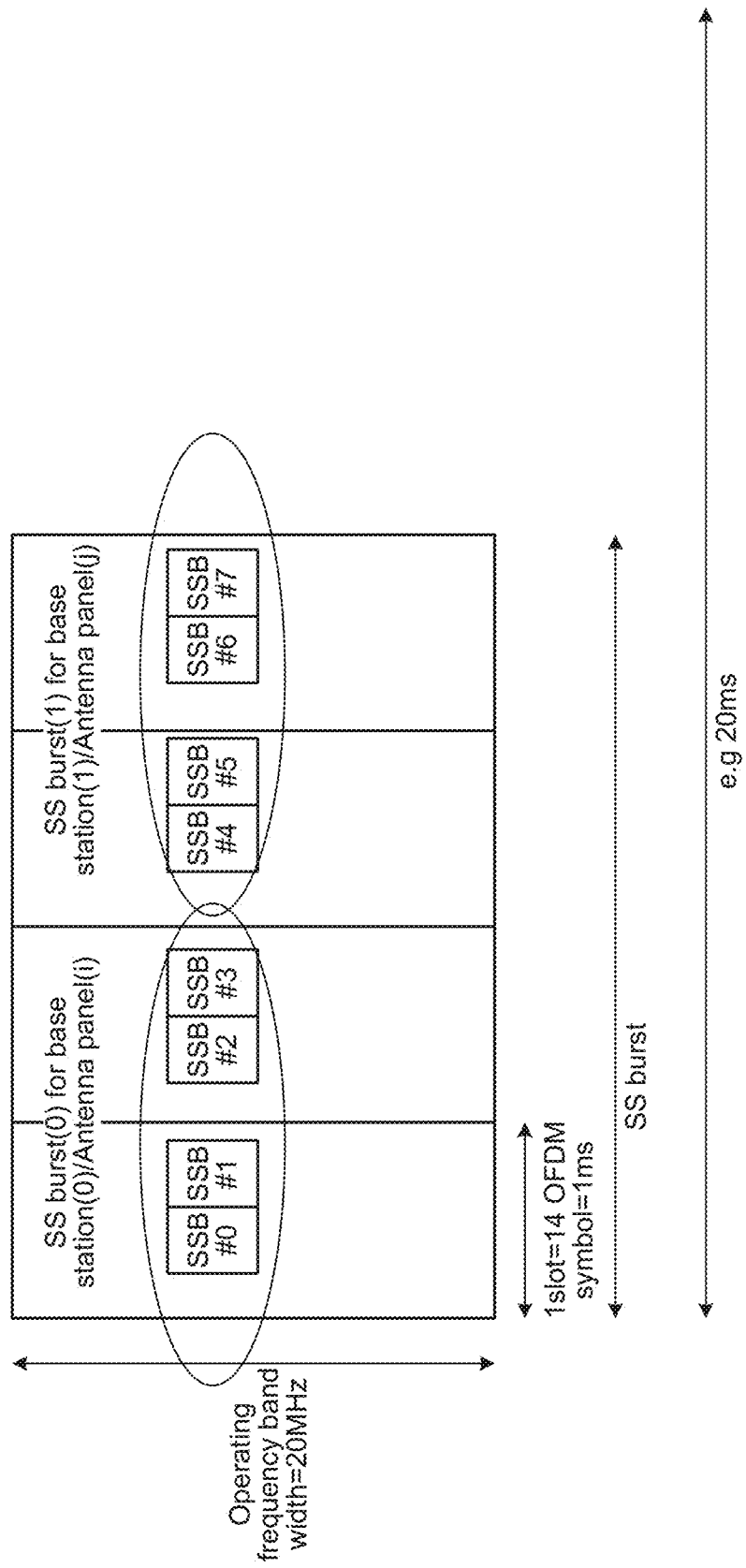
FIG. 9 is a diagram illustrating a synchronization signal.

Furthermore, FIG. 9 is a diagram illustrating an example of a synchronization signal when a different transmitting antenna panel is used for each of SSB bursts. As illustrated in FIG. 9, the base station 100 transmits the SSB contained in the SSB burst by using a different transmitting antenna panel for each of the SSB bursts. The terminal device 200 can synchronize with the SSB transmitted from the plurality of transmitting antenna panels, and at the same time, can grasp one or more optimum receiving antenna panels and receiving beams required when receiving the SSBs from the plurality of transmitting antenna panels. In this case, for example, as illustrated in FIG. 7, the terminal device 200 will grasp two sets of the receiving antenna panel and the receiving beam.

In this manner, in a case where the receiving antenna panel and receiving beam settings required for receiving control signals and user information are not in time with a plurality of optimum receiving antenna panels and receiving beam sets for receiving synchronization signals, the terminal device 200 cannot determine which antenna panel and beam should be used because of the presence of the plurality of sets, even with a rule that the set at reception of SSB is to be used as a default.

1.3. Outline of Proposed Technology

Conventionally, when the beam to be used by the terminal device 200 is not designated, the method of using the beam used at reception of the synchronization signal has been used. However, when the base station 100 on the transmitting side transmits a synchronization signal to the terminal device 200 using a plurality of antenna panels, or when there is a plurality of base stations on the transmitting side and a plurality of cases of synchronizations is performed based on the synchronization signals from each of the transmitting antenna panels of the plurality of base stations, there has been no method to determine the receiving antenna panel or receiving beam to be used by default.

Therefore, the terminal device 200 according to an embodiment performs, under an environment of multi-base stations (or multi Transmission and Reception Point (multi-TRP))/multi-antenna panel, operations using a configuration that associates a plurality of receiving antenna panels and receiving beams necessary for acquiring a plurality of cases of synchronization with each of a plurality of resource areas (formed by a frequency resource and a time resource) in which the control signal is to be received.

Specifically, in the communication method according to the embodiment, the terminal device 200 first divides a plurality of reference signals transmitted from the base station into preset groups. The terminal device 200 then selects the optimum reference signal in each of the groups. For example, in the presence of a plurality of reference signals having good communication quality, the terminal device 200 may perform grouping and selection of reference signals so that the reference signals having good communication quality are divided into different groups. Subsequently, the terminal device 200 determines a reception environment (combination of the receiving antenna panel and the receiving beam) used for receiving each of the plurality of pieces of control information (e.g. PDCCHs) transmitted from the base station 100, based on the reception environment at the reception of the reference signals selected for each of the groups.

That is, in the communication method according to the embodiment, the information of the plurality of reference signals is associated with each of the plurality of pieces of control information. Therefore, when receiving the control information, the reception environment for the reference signal associated with the control information (combination of the receiving antenna panel and the receiving beam used at the reception of the reference signal) is used. This makes it possible to select the receiving antenna panel and receiving beam to be used as the default for receiving control information, even when synchronization is established with a plurality of transmitting antenna panels (or plurality of base stations 100). That is, with the communication method according to the embodiment, it is possible to appropriately set the default for the reception environment (combination of the receiving antenna panel and the receiving beam).

In the communication method according to the embodiment, the following four pieces of information can be associated as a method of associating the control information and the reference signal with each other, and details of which will be described below.
(1) Associating with a group of SSB resources
(2) Associating with report ID
(3) Associating with SSB ID
(4) Associating with SSB with high reception power

2. Configuration Examples

Hereinafter, the configurations of the base station 100 (base station device 100) and the terminal device 200 according to the present embodiment will be described in detail.

2.1. Configuration Example of Base Station

Figure 10:
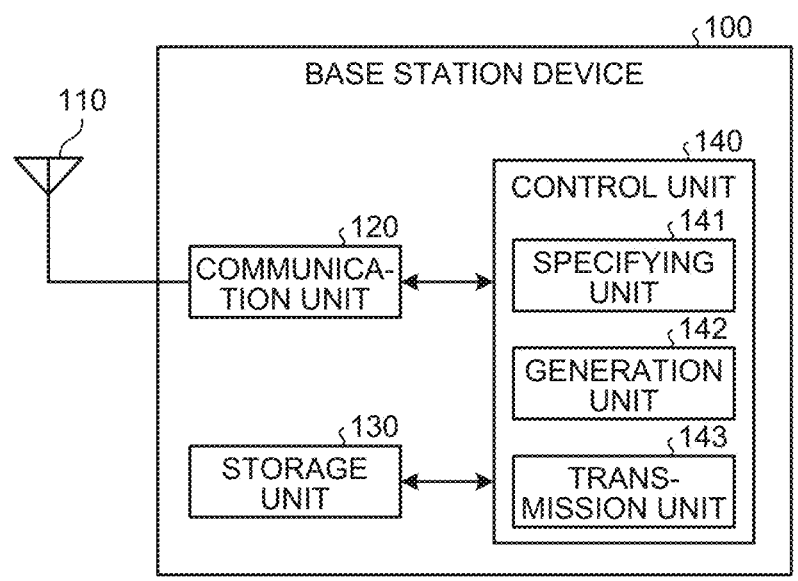
FIG. 10 is a block diagram illustrating an example of a configuration of a base station device according to an embodiment.

FIG. 10 is a block diagram illustrating an example of a configuration of the base station device 100 according to the embodiment. As illustrated in FIG. 10, the base station device 100 includes an antenna unit 110, a communication unit 120, a storage unit 130, and a control unit 140.

The antenna unit 110 radiates the signal output by the communication unit 120 to space as a radio wave. Furthermore, the antenna unit 110 converts the radio wave in space into a signal and outputs the signal to the communication unit 120. Specifically, the antenna unit 110 has a plurality of antenna elements and can form a beam.

The communication unit 120 transmits and receives signals by radio communication. For example, the communication unit 120 receives a downlink signal from the terminal device 200 and transmits an uplink signal to the terminal device 200.

Incidentally, the antenna unit 110 and the communication unit 120 are provided as a configuration including the plurality of antenna panels 70 having the analogue-digital hybrid antenna architecture described above. For example, the antenna unit 110 corresponds to the antenna 72. Furthermore, for example, the communication unit 120 corresponds to the digital circuit 50, the analogue circuit 60, and the phase shifter 71.

The storage unit 130 temporarily or permanently stores various programs and various types of data for the operation of the base station device 100.

The control unit 140 controls the operation of the entire base station device 100 to provide various functions of the base station device 100. As illustrated in FIG. 10, the control unit 140 includes a specifying unit 141, a generation unit 142, and a transmission unit 143.

The specifying unit 141 specifies a reference signal selected for each of groups by the terminal device 200 from among a plurality of grouped reference signals. For example, the specifying unit 141 specifies the reference signal reported by a reporting unit 242 of the terminal device 200 as a reference signal selected for each of groups.

The generation unit 142 generates association information for associating the resource area of each of the plurality of pieces of control information to be transmitted to the terminal device 200 with the reception environment when the terminal device 200 received the reference signal selected for each of the groups by the terminal device 200.

The transmission unit 143 transmits the association information generated by the generation unit 142 to the terminal device 200.

Detailed operation of each of configurations in the control unit 140 of the base station device 100 will be described below.

2.2. Configuration Example of Terminal Device

Figure 11:
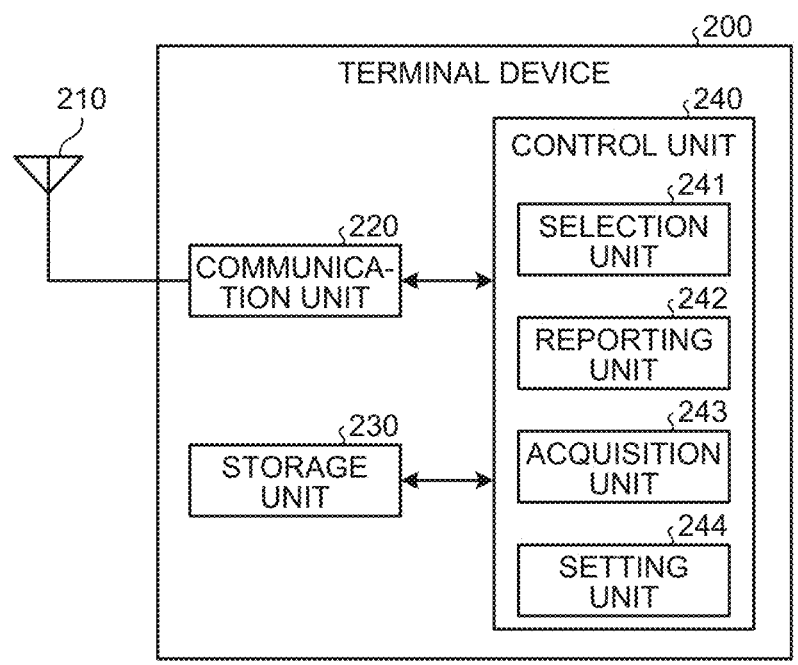
FIG. 11 is a block diagram illustrating an example of a configuration of a terminal device according to an embodiment.

FIG. 11 is a block diagram illustrating an example of a configuration of the terminal device 200 according to the embodiment. As illustrated in FIG. 11, the terminal device 200 includes an antenna unit 210, a communication unit 220, a storage unit 230, and a control unit 240.

The antenna unit 210 radiates the signal output by the communication unit 220 to space as a radio wave. Furthermore, the antenna unit 210 converts the radio wave in space into a signal and outputs the signal to the communication unit 220. Specifically, the antenna unit 210 has a plurality of antenna elements and can form a beam.

The communication unit 220 transmits and receives signals by radio communication. For example, the communication unit 220 receives a downlink signal from the base station 100 and transmits an uplink signal to the base station 100.

The antenna unit 210 and the communication unit 220 are provided as a configuration including the plurality of antenna panels 70 having the analogue-digital hybrid antenna architecture described above. For example, the antenna unit 210 corresponds to the antenna 72. Furthermore, for example, the communication unit 220 corresponds to the digital circuit 50, the analogue circuit 60, and the phase shifter 71.

The storage unit 230 temporarily or permanently stores various programs and various types of data for the operation of the terminal device 200.

The control unit 240 controls the operation of the entire terminal device 200 to provide various functions of the terminal device 200. As illustrated in FIG. 11, the control unit 240 includes a selection unit 241, a reporting unit 242, an acquisition unit 243, and a setting unit 244.

The selection unit 241 selects a reference signal for each of preset groups from a plurality of reference signals transmitted from the base station 100.

The reporting unit 242 reports various types of information to the base station 100. For example, the reporting unit 242 reports the reference signal selected for each of groups by the selection unit 241 to the base station 100.

The acquisition unit 243 acquires various types of information from the base station 100. Specifically, the acquisition unit 243 acquires from the base station 100 or independently generates association information (e.g. Association information) that associates each of resource areas (e.g. resource block to which the PDCCH is mapped) corresponding to the reception environment at the reception of each of the plurality of pieces of control information (e.g. PDCCH) transmitted from the base station 100, with information (hereinafter referred to as identification information) for specifying the reception environment used at the reception of each of pieces of the control information.

Examples of applicable identification information include: group identification information that identifies a group that each includes a plurality of reference signals; identification information (e.g. reference signal identifier) that identifies a reference signal that has the highest reception power (RSRP) at the time of synchronization from among a plurality of reference signals included in each of the groups; an identifier of report information reported by the reporting unit 242 to the base station 100; and signal identification information (SSB ID) that identifies the reference signal selected by the selection unit 241 for each of the groups.

Furthermore, when the reception environment has not been designated from the base station 100, including a case where the association information has not been received from the base station 100, for example, the acquisition unit 243 may acquire the association information associated with the identification information (for example, the group identification information) in the order of appearance (e.g. reception order) of the plurality of reference signals for each of the resource areas of the control information. Furthermore, when the reception environment has not been designated from the base station 100, the acquisition unit 243 may acquire the association information associated with the identification information (for example, signal identification information) in accordance with the reception power of the plurality of reference signals for each of the resource areas.

The setting unit 244 sets the reception environment for the time of transmitting each of the plurality of pieces of control information transmitted from the base station 100, based on the reception environment at the reception of the reference signal selected for each of groups by the selection unit 241. For example, the setting unit 244 may set the reception environment based on the association information acquired by the acquisition unit 243. Furthermore, when the reception environment has not been designated by the base station 100, the setting unit 244 may set the reception environment based on the identification information of the association information generated by the acquisition unit 243.

Furthermore, when the user information reception environment designated by the control information has not been designated from the base station 100, the setting unit 244 may set the user information reception environment based on the reception environment at the reception of the control information. Furthermore, when the user information reception environment has not been designated, the setting unit 244 may set the user information reception environment based on the identification information of the association information generated by the acquisition unit 243. Furthermore, when the setting unit 244 cannot set the user information reception environment designated by the control information based on the association information, the setting unit 244 may set the user information reception environment based on the signal transmitted from the base station 100 (for example, RRC signaling, Downlink Reference Signal, etc.).

The acquisition unit 243 may acquire or generate association information in which a plurality of pieces of identification information is associated with each of resource areas.

Hereinafter, with reference to FIGS. 12A to 21, detailed operations of individual configurations in the control unit 140 of the base station device 100 and individual configurations in the control unit 240 of the terminal device 200 will be described.

3. Embodiments

3.1. Default Setting of Resource Area in PDCCH

When the receiving antenna panel and the receiving beam to be used when receiving the control information PDCCH have not been designated by the base station 100, or when the instruction setting by the base station 100 is not in time, it is considered that the terminal device 200 should use, as the default, the receiving antenna panel and receiving beam same as the receiving antenna panel and receiving beam used at the reception of SSB.

Unfortunately, however, when a plurality of SSBs transmitted from the base station 100 is reported as an appropriate receiving beam, from among the plurality of SSBs transmitted from the base station 100, the terminal device 200 cannot determine which SSB (i.e. the receiving antenna panel and the receiving beam used for receiving the SSB) should be used as the default. With no default setting, the terminal device 200 would have to constantly keep all the receiving antenna panels in an activated state, that is, usable state, and have to constantly perform reception using the activated panels, which would impose a heavy load on the terminal. To avoid this, a proper reception environment default is required.

Therefore, the terminal device 200 according to the embodiment associates the report information reported to the base station 100 with the identification information of the resource area that receives the PDCCH.

Specifically, the control unit 140 of the base station 100 first divides the synchronized SSB bursts into two or more groups, for example, corresponding to each of the plurality of transmitting antenna panels of the base station 100 (FIG. 9).

Subsequently, the selection unit 241 of the terminal device 200 selects the optimum SSB for each of the groups. For example, the selection unit 241 selects an SSB having a high Reference Signal Received Power (RSRP) for each of the groups. Incidentally, the terminal device 200 may perform grouping or SSB selection so that the plurality of SSBs selected as appropriate receiving beams can be divided into different groups, or may first divide the plurality of SSBs into different groups and thereafter select the optimum SSB for each of the groups.

Subsequently, the reporting unit 242 of the terminal device 200 reports the report information including the SSB and RSRP selected for each of groups by the selection unit 241 to the base station 100. For example, the reporting unit 242 reports the report information including SSB "1" and RSRP "1" in a report with report ID "1", and reports the report information including SSB "2" and RSRP "2" in a report with report ID "2".

In addition, the reporting unit 242 may divide the content of the report by ID "1" and ID "2" in one report information, and may report SSB "1" and RSRP "1" by content ID "1" in the report, and may report SSB "2" and RSRP "2" by content ID "2" in the same report (Table 2).

TABLE 2

| For SSB Group 1 | SSB ID (1), RSRP for SSB ID (1) |
|---|---|
| For SSB Group 2 | SSB ID (2), RSRP for SSB ID (2) |

For example, the report information may be MeasResult Information Element (IE). More specifically, the report information may be configured as follows. MeasResult IE contains MeasId and measResultListNR. MeasId associates MeasObject with reportConfigId. The measResultListNR contains the measurement result of the reference signal measured as a MeasObject. For example, measResultListNR includes resultsSSB-Indexes as a list of ResultsPerSSB-Index. ResultsPerSSB-Index includes SSB-Index and MeasQuantityResults (e.g. RSRP, RSRQ, or SINR). These MeasResults are transmitted from the UE (terminal device 200) to the NGRAN (e.g. gNB (base station 100)) in a Measurement Report message, which is one type of RRC signaling. That is, the above-described report ID may be MeasId included in the MeasResult in the Measurement Report. The report information including the above-described SSB "1" and RSRP "1" may be SSB-Index and RSRP in SSB-Results (MeasQuantityResults) associated with the index. The above-described content ID may be SSB-Index. Note that RRC signaling is RRC layer signaling transmitted and received between the UE (terminal device 200) and RAN (base station 100). For example, the UE receives an RRC Setup Request message and the RAN transmits the RRC Setup Request message, and thereafter the UE enters an RRC-CONNECTED state. The Measurement Report described above and the RRC Reconfiguration message described below are transmitted and received in the RRC-CONNECTED state.

Subsequently, based on the report information, the base station 100 sets, for the terminal, the resource area to receive the PDCCH in the form of explicitly indicating a corresponding SSB. FIGS. 12A to 12D are diagrams each illustrating resource areas set for a terminal. As illustrated in FIGS. 12A to 12D, the resource area is an area formed by frequency resource and time resource, and is a control area for transmitting and receiving control information. The resource area may be one or more of a Resource Element Group (REG) constituted with one Resource Block and one OFDM symbol, for example. Alternatively, the resource area may be a Control Channel Element (CCE) constituted with a plurality of (e.g. six) REGs. Further alternatively, the resource area may be a Control-resource set (CORESET) constituted with a plurality of Resource Blocks and one to three OFDM symbols. At least one of the parameters and L values illustrated in Table 3 below constituting CORESET may be transmitted from NGRAN (base station 100) to the UE (terminal device 200) by RRC signaling (e.g. RRC Reconfiguration message). The RRC Reconfiguration message here may also include a MeasConfig (measurement setting) for measuring the reference signal (e.g. SSB) described above.

TABLE 3

| Parameter |
|---|
| $N_{RB}^{CORESET}$ |
| $N_{symb}^{CORESET}$ |
| $N_{REG}^{CORESET}$ |

Figure 12A:
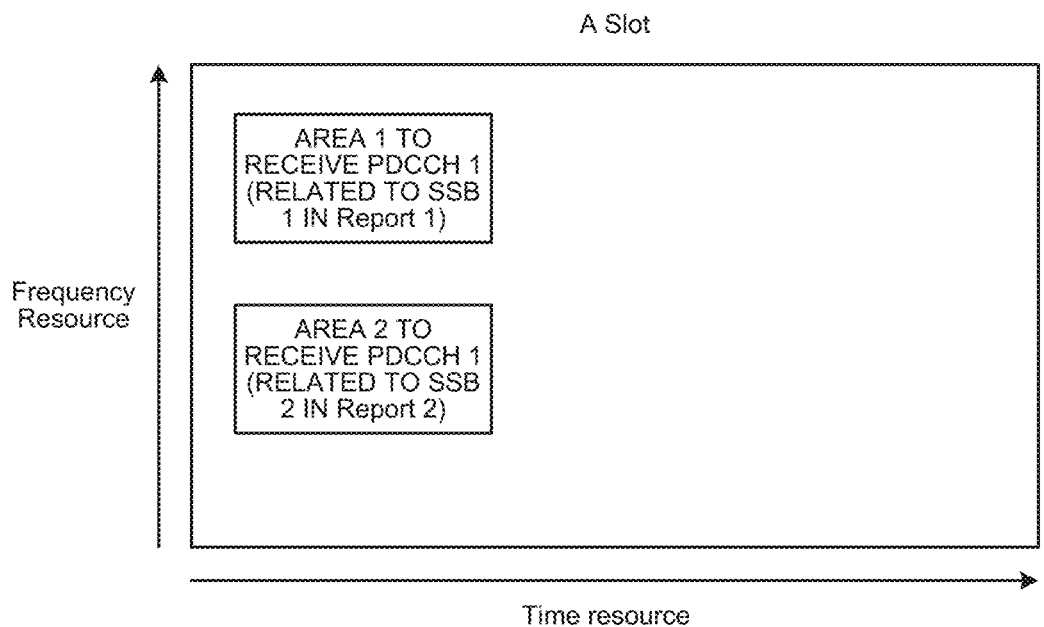
FIG. 12A is a diagram illustrating resource areas set for a terminal.

For example, as illustrated in FIG. 12A, the generation unit 142 of the base station 100 defines the settings that the area "1" to receive PDCCH "1" is related to SSB "1" reported by the terminal device 200, and the area "2" to receive PDCCH "2" is related to SSB "2" reported by the terminal device 200.

Figure 12B:
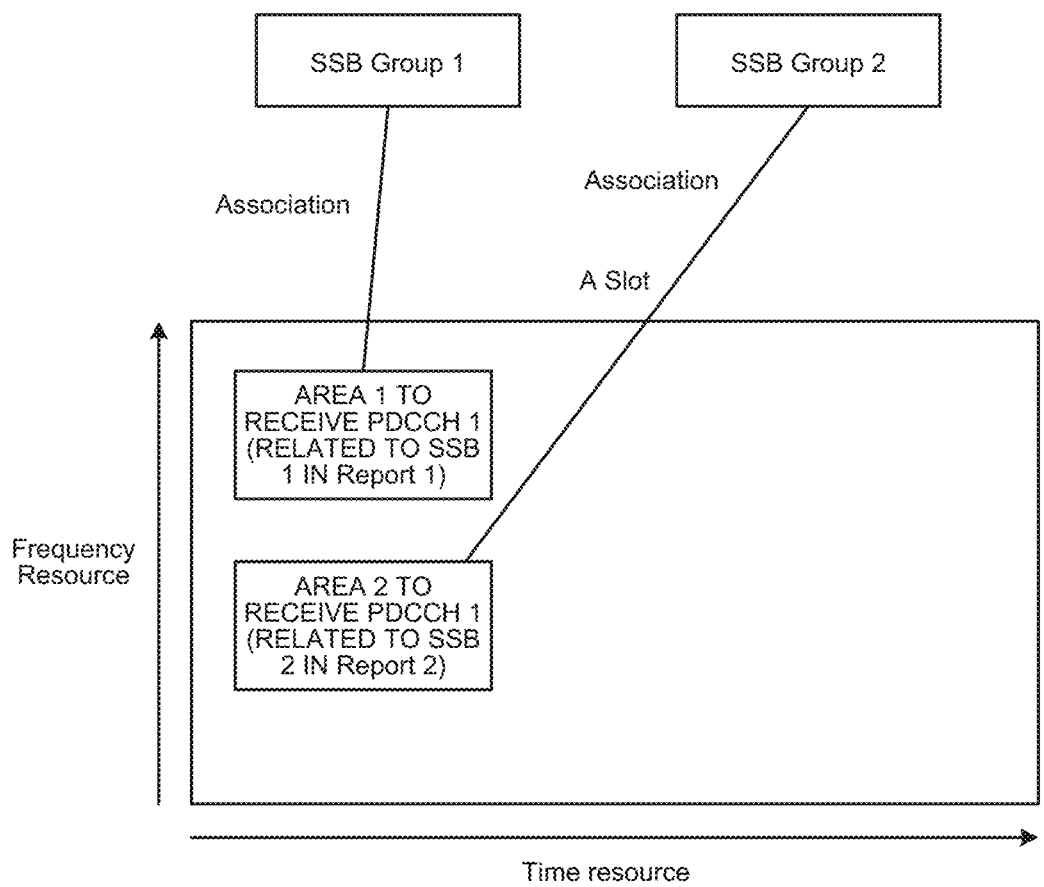
FIG. 12B is a diagram illustrating resource areas set for a terminal.

More specifically, as illustrated in FIG. 12B, the generation unit 142 of the base station 100 may associate the resource area of each of pieces of control information (e.g. PDCCH) with the group identification information that identifies the group including a plurality of SSBs. Specifically, the generation unit 142 associates the PDCCH "1" with the group ID "1" of the SSB "1", and associates the PDCCH "2" with the group ID "2" of the SSB "2".

That is, the acquisition unit 243 of the terminal device 200 acquires association information in which the group identification information that identifies the group including the plurality of reference signals is associated with the control information. More specifically, group identification information and association information may be included in the RRC signaling (e.g. RRC Reconfiguration message, RRC Setup message) transmitted from NGRAN (base station 100) and received by the UE (terminal device 200). For example, controlResourceSetToAddModList IE in PDCCH-Config (PDCCH configuration information) included in RRC Reconfiguration message is included. Therefore, the group identification information (e.g. SSBGroupId IE) may be included so as to be associated with ControlResourceSet included in controlResourceSetToAddModList. When the terminal device 200 has acquired the association information in which the group identification information that identifies the group including the plurality of reference signals is associated with the control information, or when the group identification information is preliminarily associated with the control information, the terminal device 200 may perform the following consideration, determination, or assumption. The terminal device 200 considers, determines, or assumes that each of the control information receptions (e.g. PDCCH receptions) or the control information resource areas (e.g. CORESETs) has a quasi collocation with each of associated SSB groups (i.e. combinations of the receiving antenna panels and receiving beams used for receiving the SSB groups). Note that the reception (measurement or identification) of the SSB group here by the terminal device 200 may be the reception (measurement or identification) performed by the terminal device 200 during an initial access procedure (e.g. Random Access Procedure). Moreover, this consideration, determination, or assumption by the terminal device 200 may be performed when the SSB or SSB group measured, or measured/reported, by the terminal device 200 during the initial access procedure (e.g. Random Access Procedure) exists in plurality (i.e. when the combination of receiving antenna panels and receiving beams used to measure the SSB or SSB group exists in plurality).

Furthermore, as illustrated in FIG. 12C, the generation unit 142 of the base station 100 may associate the resource area of each of pieces of control information with the signal identification information that identifies the SSB selected for each of groups. That is, the acquisition unit 243 of the terminal device 200 may acquire the association information in which the signal identification information that identifies the reference signal selected by the selection unit 241 for each of groups is associated as the identification information. More specifically, the signal identification information and association information may be included in the RRC signaling (e.g. RRC Reconfiguration message, RRC Setup message) transmitted from NGRAN (base station 100) and received by the UE (terminal device 200). For example, controlResourceSetToAddModList IE in PDCCH-Config (PDCCH configuration information) included in RRC Reconfiguration message is included. Therefore, the signal identification information (e.g. SSB-Index) may be included so as to be associated with ControlResourceSet included in controlResourceSetToAddModList. When the terminal device 200 has acquired the association information in which the signal identification information (e.g. SSB-Index) that identifies the plurality of reference signals is associated with the control information, or when the signal identification information (e.g. SSB-Index) is preliminarily associated with the control information, the terminal device 200 may perform the following consideration, determination, or assumption. The terminal device 200 considers, determines, or assumes that each of the control information receptions (e.g. PDCCH receptions) or the control information resource areas (e.g. CORESETs) has a quasi collocation with each of associated SSBs (i.e. combinations of the receiving antenna panels and receiving beams used for receiving the SSBs). Note that the reception (measurement or identification) of the SSBs here by the terminal device 200 may be the identification performed by the terminal device 200 during the initial access procedure (e.g. Random Access Procedure). Moreover, this consideration, determination, or assumption by the terminal device 200 may be performed when the SSB measured, or measured/reported, by the terminal device 200 during the initial access procedure (e.g. Random Access Procedure) exists in plurality (i.e. when the combination of receiving antenna panels and receiving beams used to measure the SSB exists in plurality).

Figure 12D:
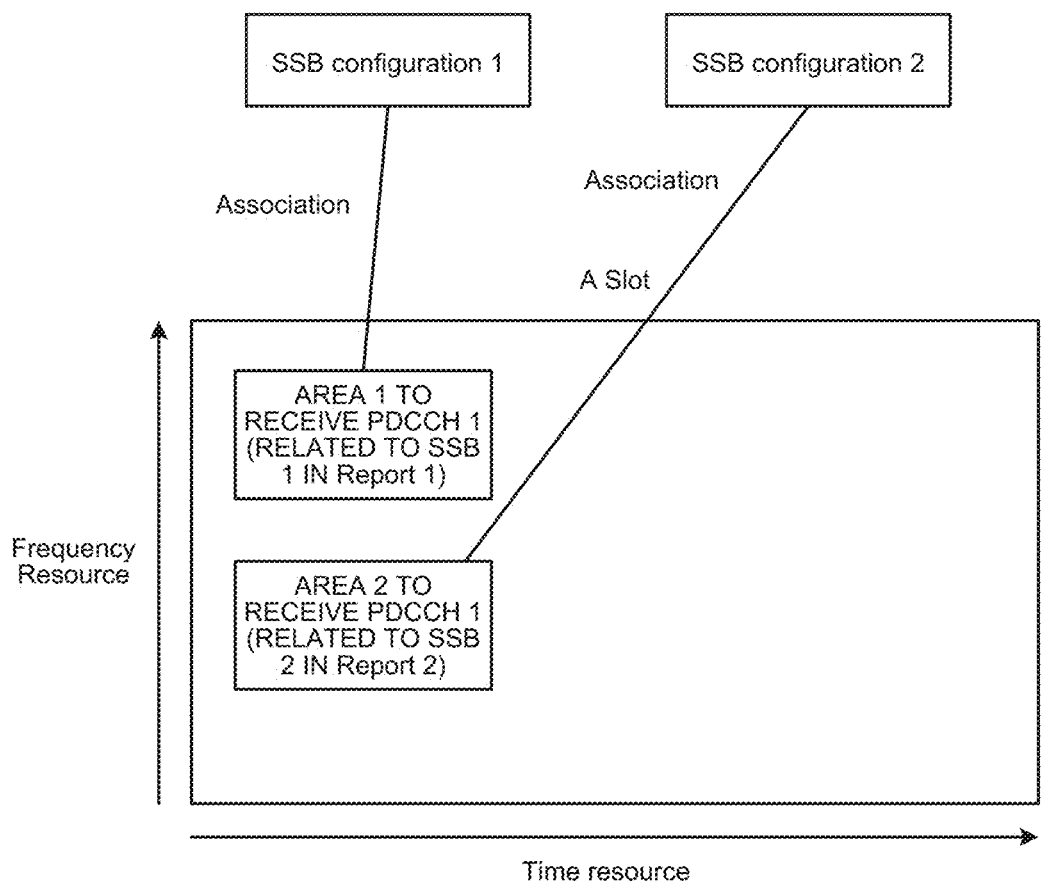
FIG. 12D is a diagram illustrating resource areas set for a terminal.

Furthermore, as illustrated in FIG. 12D, the generation unit 142 of the base station 100 may associate the resource area of each of pieces of control information with report information. For example, as illustrated in FIG. 12A, the generation unit 142 of the base station 100 defines the settings that the area "1" to receive PDCCH "1" is related to SSB "1" of report ID "1" which is report information of the terminal device 200, and the area "2" to receive PDCCH "2" is related to SSB "2" of report ID "2" which is the report information. That is, the acquisition unit 243 of the terminal device 200 may acquire the association information in which the report information reported by the reporting unit 242 to the base station 100 is associated as the identification information. For example, the resource area information (e.g. configuration information regarding CORESET) may be included so that the above-described MeasConfig is associated with MeasId being a report ID. In addition to or instead of this, ControlResourceSet in PDCCH-Config (PDCCH configuration information) may include MeasId. With this setting, the reference signal (e.g. SSB) used for the measurement indicated (identified) by MeasId can be associated with resource area information (e.g. ControlResourceSet). When the terminal device 200 has acquired the association information in which the report information (e.g. MeasId) that each reports a plurality of reference signals is associated with the control information, or when the report information (e.g. MeasId) is preliminarily associated with the control information, the terminal device 200 may perform the following consideration, determination, or assumption. The terminal device 200 considers, determines, or assumes that each of the control information receptions (e.g. PDCCH receptions) or the control information resource areas (e.g. CORESETs) has a quasi collocation with each of associated report information (e.g. MeasId) (i.e. combinations of the receiving antenna panels and receiving beams used for receiving the reported SSBs indicated by the report information). Note that the reception (measurement or identification) of the reported SSBs indicated by the report information here by the terminal device 200 may be the reception (measurement or identification) performed by the terminal device 200 during the initial access procedure (e.g. Random Access Procedure). Moreover, this consideration, determination, or assumption by the terminal device 200 may be performed when the SSB measured, or measured/reported, by the terminal device 200 during the initial access procedure (e.g. Random Access Procedure) exists in plurality (i.e. when the combination of receiving antenna panels and receiving beams used to measure the SSB exists in plurality).

Incidentally, the generation unit 142 may generate association information including only the SSB identification information excluding the report ID. That is, the generation unit 142 may acquire the association information associated with the signal identification information that identifies the reference signal selected by the selection unit 241 for each group, as the identification information.

When the setting unit 244 of the terminal device 200 has no knowledge of the receiving antenna panel and the receiving beam to be used for the area "1" to receive the PDCCH "1" (e.g. when the combination of the receiving antenna panel and the receiving beam to be used is not explicitly or implicitly instructed by the base station 100 (when the configuration information indicating the combination is not transmitted)), the setting unit 244 of the terminal device 200 uses SSB "1" as a default by referring to the association information, and accordingly receives PDCCH "1" using the receiving antenna panel and receiving beam used at the reception of SSB "1".

Alternatively, the generation unit 142 of the base station 100 may generate the association information associated with the signal identification information that identifies the reference signal having the highest reception power at the time of synchronization, among the plurality of reference signals included in each of groups, and may transmit the generated association information to the terminal device 200.

Figure 13:
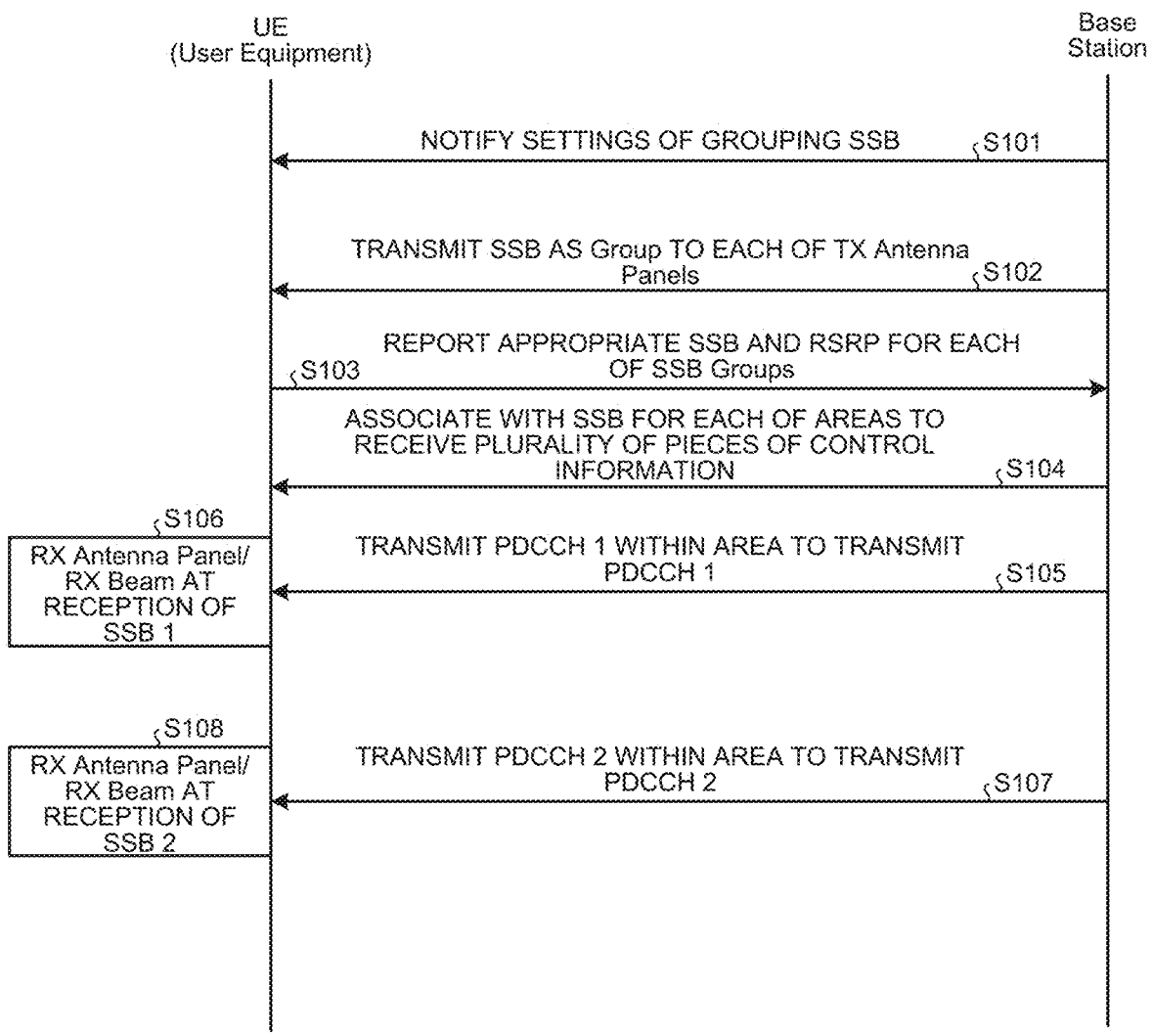
FIG. 13 is a sequence diagram of a communication control process executed by a communication system according to an embodiment.

FIG. 13 is a sequence diagram of a communication control process executed by a communication system according to an embodiment. As illustrated in FIG. 13, the base station 100 notifies the terminal device 200 of the settings of grouping SSBs (step S101). As described above, the settings of grouping SSBs may be notified from NGRAN (base station 100) to UE (terminal device 200) as a new IE referred to as SSBGroupId. The settings may be notified using RRC signaling (e.g. RRC Reconfiguration message, or RRC Setup message).

Subsequently, the base station 100 transmits the SSBs as a group for each of transmitting antenna panels (step S102). In other words, the terminal device 200 monitors and measures a plurality of SSBs divided into a plurality of groups. Subsequently, the terminal device 200 reports the appropriate SSB (i.e. best beam) and RSRP for each of groups (step S103).

Subsequently, the base station 100 associates each of resource areas that receives a plurality of pieces of control information (PDCCH) with the SSB (step S104). As described above, the resource area that receives a plurality of pieces of control information (PDCCH) is associated with the SSB by the various methods described above. The information (association information) indicating the association described above can then be notified from the base station 100 to the terminal device 200. Subsequently, the base station 100 transmits the PDCCH "1" to the terminal device 200 within the resource area from which the PDCCH "1" should be transmitted (step S105).

Subsequently, the terminal device 200 receives the PDCCH "1" by, for example, the receiving antenna panel and the receiving beam used at the reception of the SSB "1" based on the association information (step S106).

Furthermore, the base station 100 transmits the PDCCH "2" to the terminal device 200 within the resource area from which the PDCCH "2" should be transmitted (step S107).

Subsequently, the terminal device 200 receives the PDCCH "2" by, for example, the receiving antenna panel and the receiving beam used at the reception of the SSB "2" based on the association information (step S108).

Note that the above-described association information or association does not have to be notified from the base station 100 to the terminal device 200, and may be preliminarily defined by a standard or the like.

In this manner, the terminal device 200 according to the embodiment determines the reception environment when receiving each of the plurality of pieces of control information transmitted from the base station 100 based on the reception environment (combination of the receiving antenna panel and the receiving beam) used at the reception of the reference signal, which is the synchronization signal used at the time of synchronization, making it possible to appropriately select the receiving antenna panel and the receiving beam to be used as a default even when synchronization is established with the plurality of transmitting antenna panels (or plurality of base stations 100).

In the above embodiment, the report information and the association between the resource area of the PDCCH and the reference signal are explicitly set in advance from the base station 100 to the terminal device 200 (refer to FIG. 12A). However, this setting can be omitted. This is because this setting cannot be established unless the terminal device 200 has completed the synchronization process and has reported the report information. For example, since the synchronization process is continued even during operations other than the initial access, there is a demand for setting the optimum reception environment even when the optimum SSB is frequently changed and the report information is not reported.

Figure 14:
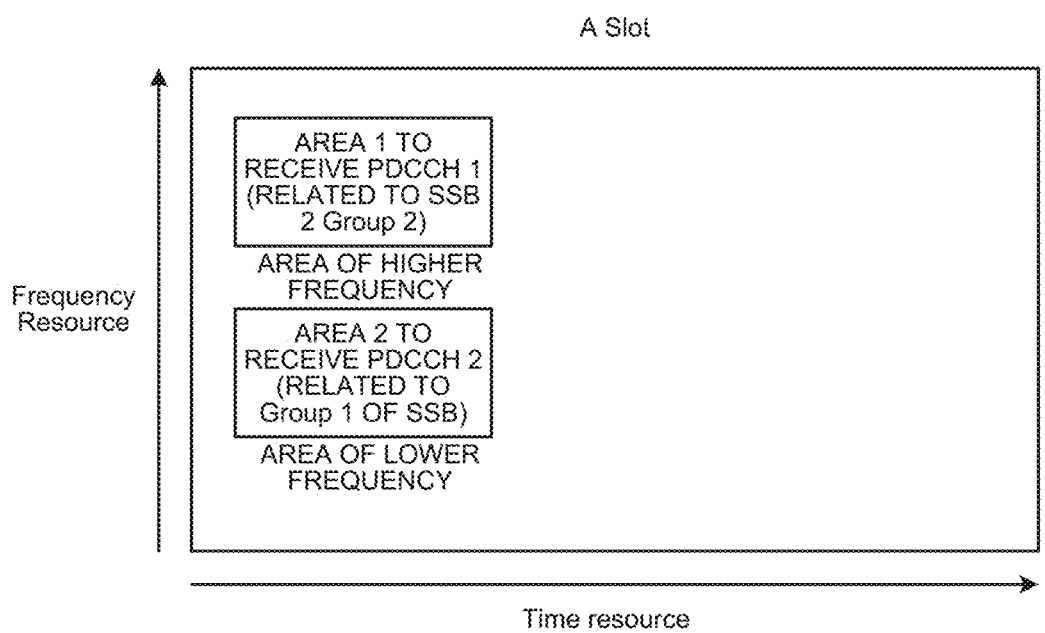
FIG. 14 is a diagram illustrating resource areas set for a terminal.
Figure 15:
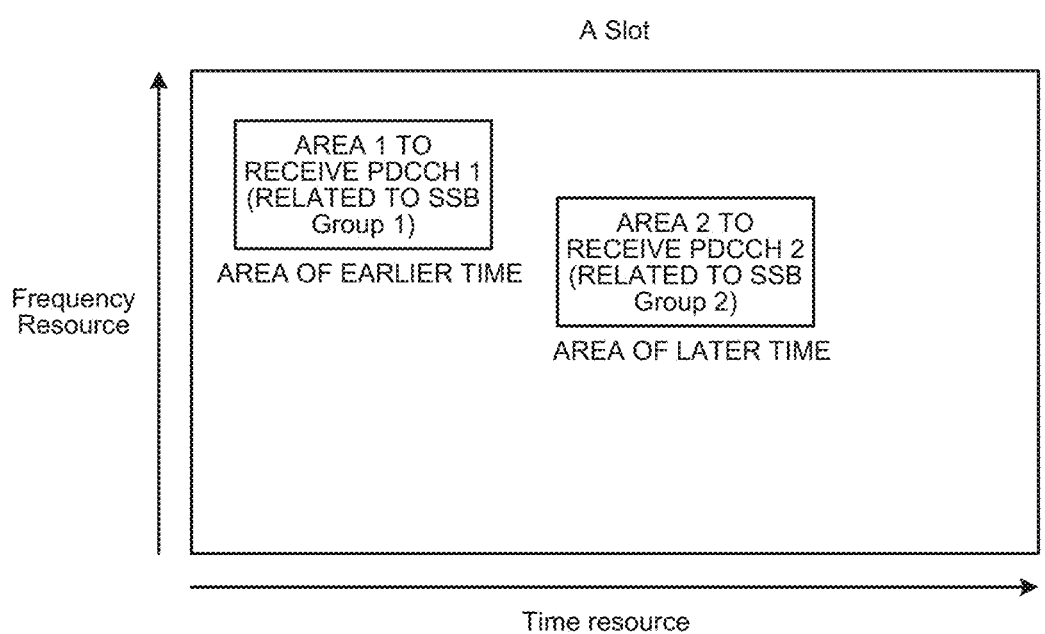
FIG. 15 is a diagram illustrating resource areas set for a terminal.

Therefore, as illustrated in FIGS. 14 and 15, the base station 100 may generate association information by associating identification information (signal identification information or reference signal group identification information) to each of the resource areas of control information in the order of appearance of the plurality of reference signals. FIGS. 14 and 15 are diagrams illustrating resource areas set onto a terminal.

For example, as illustrated in FIG. 14, when the base station 100 arranges two resource areas in the frequency direction, the group that appears first in the SSB burst is set in a low frequency resource area while the group that appears later in the SSB burst is set in a high frequency resource area.

Alternatively, as illustrated in FIG. 15, when the base station 100 arranges two resource areas in the time direction, the group that appears first in the SSB burst is set in the resource area of earlier time while the group that appears later in the SSB burst is set in the resource area of later time.

With these settings, the terminal device 200 can set the optimum reception environment without performing signaling for setting the correspondence between the plurality of reference signals and the resource areas from the base station 100, reporting from the terminal device 200, or the like.

Figure 16:
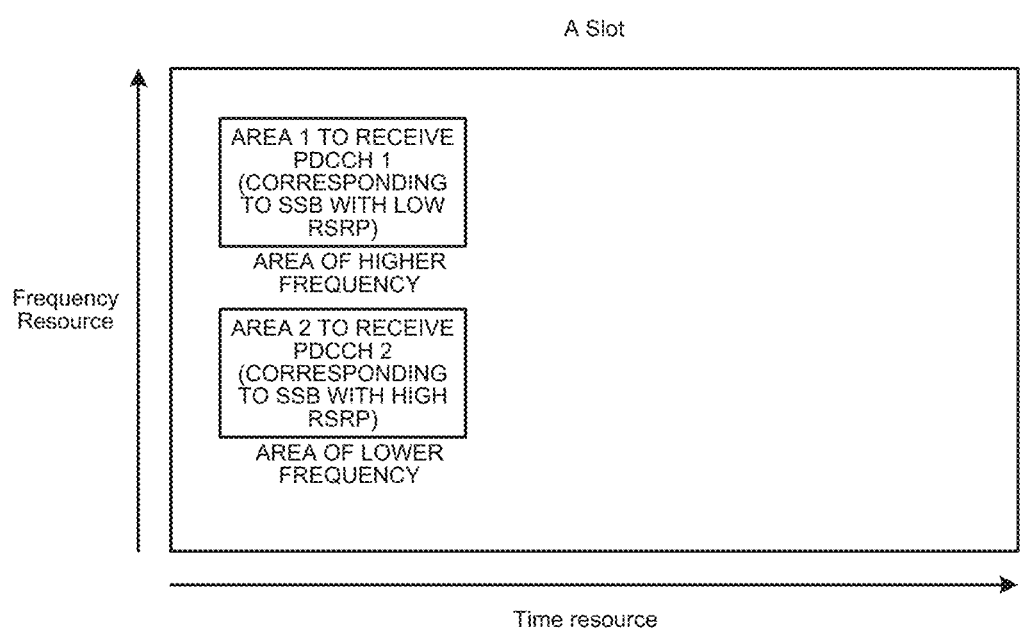
FIG. 16 is a diagram illustrating resource areas set for a terminal.
Figure 17:
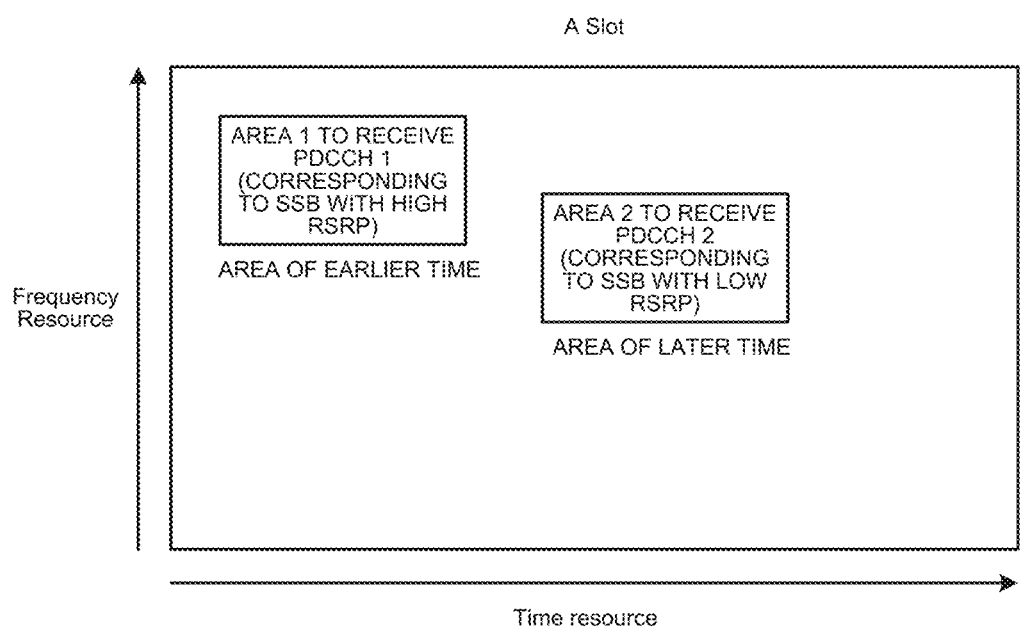
FIG. 17 is a diagram illustrating resource areas set for a terminal.

Furthermore, as illustrated in FIGS. 16 and 17, the base station 100 may generate the association information by associating the identification information with each of the resource areas in accordance with the reception power of the plurality of reference signals. FIGS. 16 and 17 are diagrams illustrating resource areas set for a terminal.

For example, as illustrated in FIG. 16, when arranging the two resource areas in the frequency direction, the base station 100 sets the SSB having the higher reception power among the two SSBs in the resource area of low frequency, while setting the SSB with low reception power in the resource area of high frequency.

Alternatively, as illustrated in FIG. 17, when arranging the two resource areas in the time direction, the base station 100 sets the SSB having the higher reception power among the two SSBs in the resource area of earlier time, while setting the SSB with low reception power in the resource area of later time.

This setting enables setting of the identification information for the resource area using the magnitude of the reception power, making it possible to appropriately perform default setting of the reception environment only with the process on the terminal device 200 side.

As described above, since the terminal device 200 can appropriately perform default selection of the reception environment, there will be no need to activate all the receiving antenna panels and the receiving beams in the plurality of resource areas, having the effect of reducing the load on the terminal device 200.

3.2. Default Setting of Resource Area in PDSCH

The above has described a default setting method when the reception environment for receiving PDCCH is not designated from the base station 100. The following will describe a method of setting the default of Physical Downlink Shard Channel (PDSCH), which is the user information scheduled by PDCCH.

Figure 18:
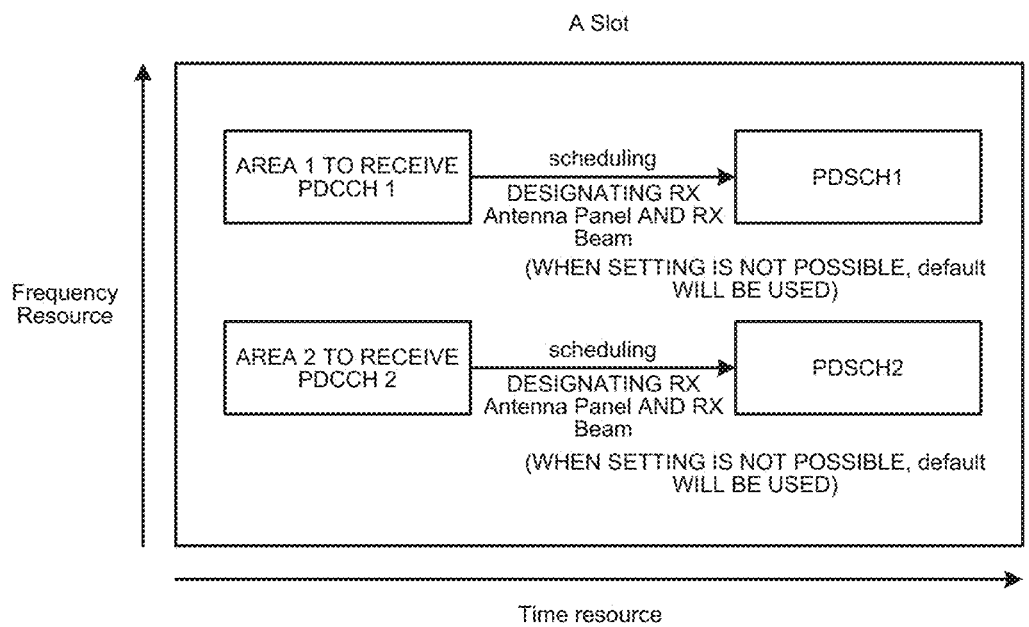
FIG. 18 is a diagram illustrating a method of setting a resource area for PDSCH.

When receiving PDSCH, the terminal device 200 also needs to determine which receiving antenna panel and receiving beam to use. For example, the base station 100 might be able to designate this selection in the PDCCH. When there is no setting by PDCCH, the terminal device 200 needs to use the default reception environment (receiving antenna panel and receiving beam) for receiving PDSCH (refer to FIG. 18). FIG. 18 is a diagram illustrating a method of setting a resource area for PDSCH.

For example, as illustrated in FIG. 18, when PDSCH "1" is scheduled by the resource area for PDCCH "1" (e.g. CORESET for PDCCH "1"), and when there is no designation of reception environment by PDCCH "1" (e.g. reception environment is not designated in Downlink Control Information) and thus the reception environment cannot be determined, there is a need to use a default. Here, it is necessary to consider both the cases where the default of PDCCH is associated with and not associated with SSB. PDSCH suddenly appears due to PDCCH. In other words, the PDSCH has only appeared at the location designated in the PDCCH scheduling, with no association between the specific PDSCH and the plurality of SSBs. In other words, there has been a similar issue in PDSCH as to how to set the default.

Therefore, in the present disclosure, when there is no setting of the reception environment (combination of the receiving antenna panel and the receiving beam) for receiving the PDSCH, the reception environment (combination of the receiving antenna panel and the receiving beam) actually used at the reception of PDCCH scheduled for the PDSCH will be used (reused) as a default. That is, when the receiving antenna panel and the receiving beam for receiving the PDCCH are explicitly set by the base station 100, the same receiving antenna panel and the receiving beam as those used at the reception of the PDCCH will be used when receiving the PDSCH.

Figure 19:
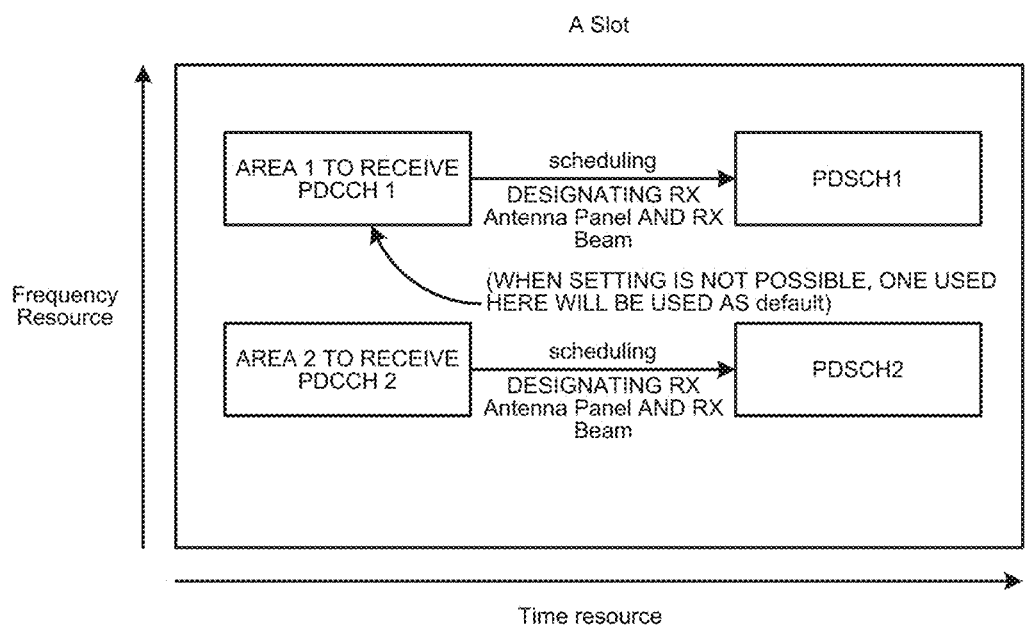
FIG. 19 is a diagram illustrating a method of setting a resource area for PDSCH.

FIG. 19 is a diagram illustrating a method of setting resource areas of PDSCH. As illustrated in FIG. 19, when PDSCH "1" is scheduled by the resource area for PDCCH "1" and when there is no designation of the reception environment for PDSCH "1" by PDCCH "1" and it is not possible to determine the reception environment for PDSCH "1", the terminal device 200 will use the reception environment (combination of the receiving antenna panel and the receiving beam) used at reception of PDCCH "1", as the default for PDSCH.

In this manner, the terminal device 200 determines the PDSCH reception environment designated in the control information based on the reception environment (combination of the receiving antenna panel and the receiving beam) used at the reception of the control information (e.g. PDCCH) and thereby can appropriately set the default for PDSCH.

When a plurality of reception environments (combinations of receiving antenna panels and receiving beams) for receiving PDCCH exists in plurality, the plurality of reception environments can be set as a default. That is, the acquisition unit 243 of the terminal device 200 acquires the association information having a plurality of pieces of identification information (e.g. SSB IDs) associated with each of the resource areas of PDSCH.

For example, when the terminal device 200 can receive PDCCH by both the antenna panel "1" and the antenna panel "2", the terminal device 200 can use one of these panels (which means that only one of them is valid as the default) or can use both at the same time (both are valid as defaults) when receiving PDSCH.

In the above, in a case where the reception environment actually used for the reception of PDCCH is not set when the default is set for the reception environment of PDCSH (combination of the receiving antenna panel and the receiving beam), the reception environment set as the default of PDCCH may be set as the reception environment as the default of PDSCH.

Figure 20:
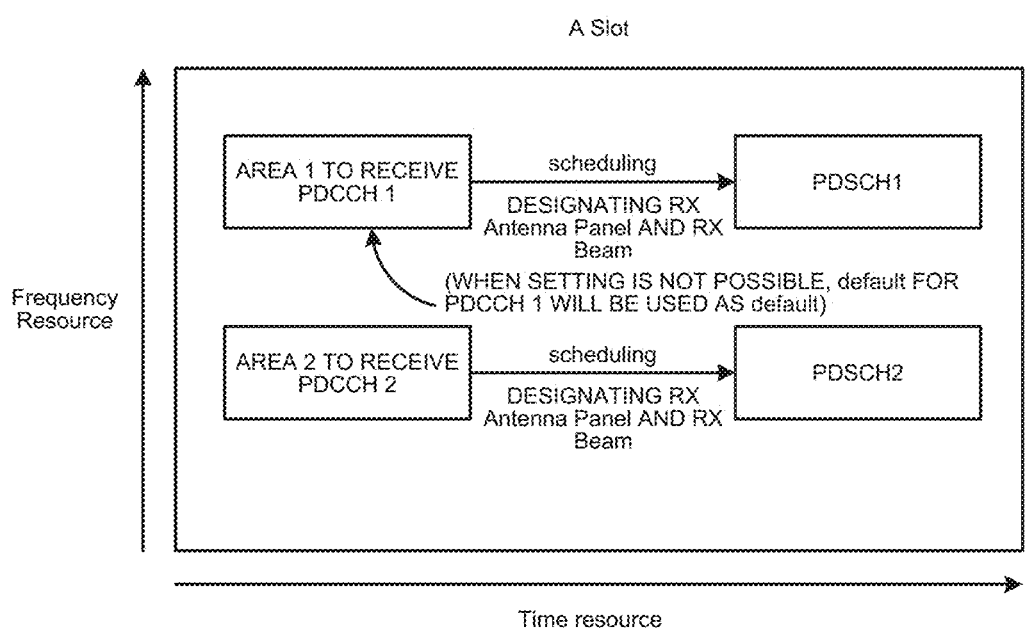
FIG. 20 is a diagram illustrating a method of setting a resource area for PDSCH.

That is, the terminal device 200 sets the PDSCH reception environment based on PDCCH association information acquired from the base station 100. FIG. 20 is a diagram illustrating a method of setting resource areas for PDSCH.

As illustrated in FIG. 20, for example, when PDSCH "1" is scheduled by the resource area of PDCCH "1" and when there is no designation of the reception environment by PDCCH "1" and it is not possible to determine the reception environment, the terminal device 200 will use PDCCH "1" as a default for PDSCH.

This makes it possible to appropriately set a default for PDSCH even when there is no setting of the reception environment to be used at the reception of PDCCH.

Here, defaults for the PDSCH cannot be narrowed down to one in some cases. For example, there is a case where PDCCH cannot be received by only one antenna panel and PDCCH can be received by a plurality of antenna panels. In such a case, it is allowable to provide a plurality of default reception environments for receiving PDSCH. With a plurality of defaults, the terminal device 200 may select and use one of the defaults, or may use the plurality of defaults to receive the PDSCH (refer to FIG. 21).

Figure 21:
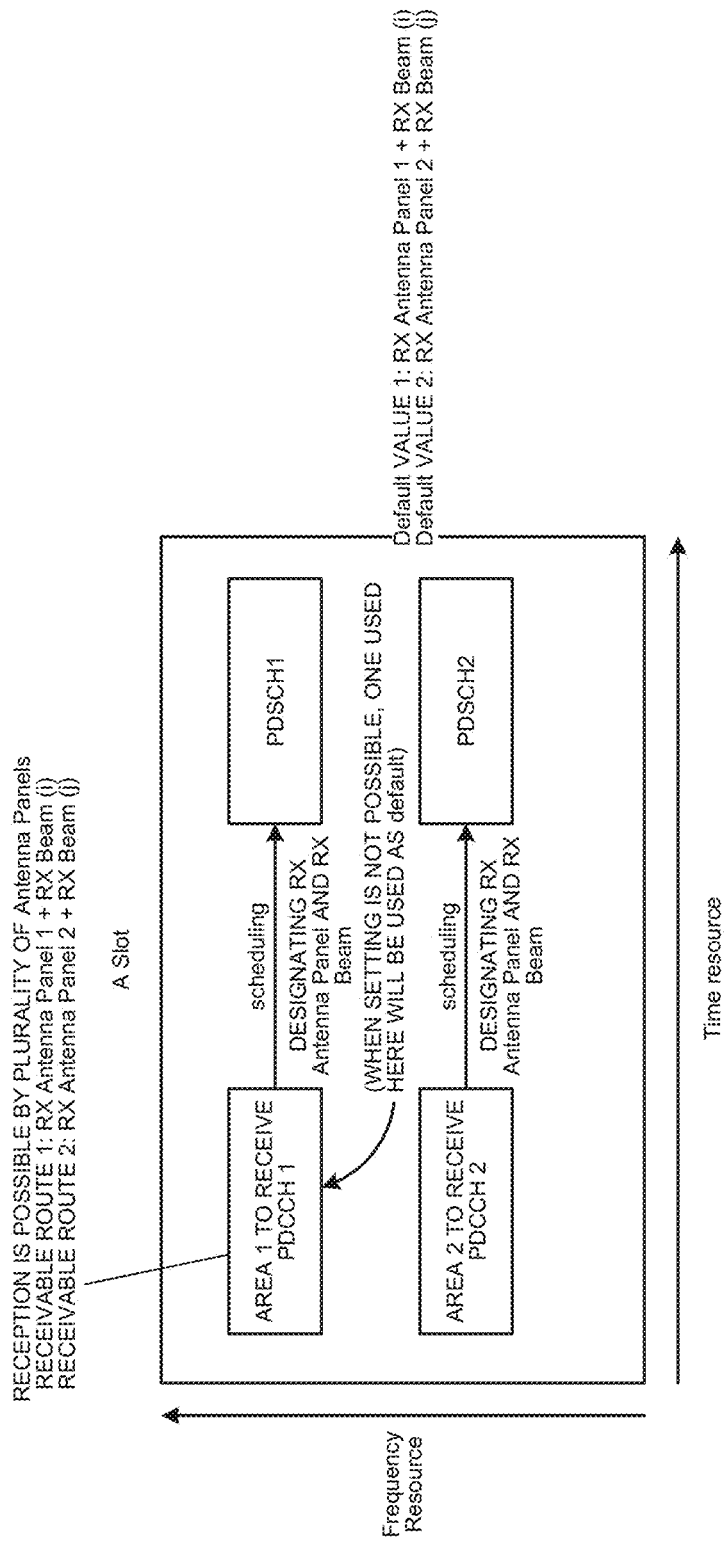
FIG. 21 is a diagram illustrating a method of setting a resource area for PDSCH.

FIG. 21 is a diagram illustrating a method of setting resource areas for PDSCH. As illustrated in FIG. 21, for example, when PDSCH "1" is scheduled by the resource area of PDCCH "1" and when there is no designation of the reception environment (combination of the receiving antenna panel and the receiving beam) by PDCCH "1" and it is not possible to determine the reception environment, the terminal device 200 will use the reception environment used for receiving PDCCH "1", as the default for PDSCH. That is, in FIG. 21, a receiving antenna panel "1" and a receiving beam "i" being a first receivable path and a receiving antenna panel "2" and a receiving beam "j" being a second receivable path will be used.

In particular, in communications that need to ensure reliability such as URLLC use cases, it is conceivable to use a method of transmitting PDCCH that controls PDSCH from a plurality of base stations 100 (or from a plurality of transmitting antenna panels) so as to improve reliability. In that case, it is preferable to have a plurality of PDSCH defaults. There can be two cases: one can receive PDSCH with either of the plurality of defaults, and the other can receive PDSCH with only one of the plurality of defaults. In addition, a plurality of PDSCHs might be transmitted or only one PDSCH might be transmitted by the plurality of PDCCHs. The plurality of PDSCHs is located on the same frequency and time resources.

By setting a plurality of defaults in this manner, it is possible to try one of the desired defaults for the convenience of the terminal device 200 when the defaults cannot be narrowed down to one. Furthermore, even when reception by one default receiving antenna panel fails due to blocking or other reasons, reception by other default receiving antenna panels might be possible, which is effective for communication that requires reliability in particular.

Moreover, there is another case where PDSCH is received in a plurality of reception environments while PDCCH is received in one reception environment. For example, there are cases where the receiving antenna panel "1" and PDCCH "1" received by a receiving beam "X" are used to schedule the PDSCH "1" received by the receiving antenna panel "1" and the receiving beam "X", and at the same time, used to schedule the PDSCH "2" received by the receiving antenna panel "2" and a receiving beam "Y". In such a case, it is not desirable to use, as the default for PDSCH "2", the same receiving antenna panel "1" and receiving beam "X" as those used for the PDCCH "1". In such a case, simply using the PDSCH "1" default, that is, the same receiving antenna panel "1" and receiving beam "X" as the PDCCH "1" that scheduled PDSCH "1" would lead to successful or unsuccessful reception depending on the case.

Therefore, when the receiving antenna panel and the receiving beam for receiving the PDSCH are not designated by the PDCCH, or when the designation cannot be used because the duration between the PDCCH and the PDSCH is not in time, etc., the terminal device 200 can adopt the following two methods as the PDSCH default reception environment.

That is, the first is a method of using the default reception environment (combination of the receiving antenna panel and the receiving beam) designated by RRC signaling or the like for PDSCH. The second is a method of using the reported downlink reference signal SSB or CSI-RS for receiving the PDSCH.

That is, when it is not possible to set the PDSCH reception environment designated by PDCCH, the terminal device 200 sets the PDSCH reception environment based on an RRC signal transmitted from the base station 100. This makes it possible to appropriately determine the default reception environment to be used by the terminal device 200 when scheduling a plurality of PDSCHs with one PDCCH, enabling the terminal device 200 to receive the PDSCH.

Incidentally, the antenna panel in the above embodiment may correspond to a combination of one or a plurality of antenna ports. In addition to or instead of this, the antenna panel in the above embodiments may correspond to a combination of one or more antenna ports and Quasi-co-location parameters.

4. Application Examples

The technology according to the present disclosure is applicable to various products.

For example, the base station 100 may be any of eNodeB, ng-eNodeB, gNodeB, or en-gNodeB as described above. In addition to or instead of this, the base station 100 may be referred to as EUTRAN when the base station 100 is either eNodeB or en-gNodeB. In addition to or instead of this, the base station 100 may be referred to as NGRAN when the base station 100 is either gNodeB or ng-eNodeB. Furthermore, the base station 100 may be a Master Node (MN) or a Secondary Node (SN) in Dual Connectivity. That is, the base station 100 may be a Secondary gNodeB in the case of EUTRA-NR Dual Connectivity or in the case of NR-NR Dual Connectivity. In this case, a part or all of the above-described RRC signaling may be transmitted to and received from the UE (terminal device 200) via the MN, or may be directly transmitted or received between the UE (terminal device 200) and a secondary gNodeB (base station 100) via a Signaling Radio Bearer (SRB) 3. The above-described PDCCH and PDSCH may be transmitted in a Secondary Cell Group (SCG) between the UE (terminal device 200) and the secondary gNodeB (base station 100). In addition to or instead of this, the base station 100 may be a Master gNodeB in the case of NR-EUTRA Dual Connectivity or in the case of NR-NR Dual Connectivity. In this case, the above-described RRC signaling may be transmitted or received between the UE (terminal device 200) and the Master gNodeB (base station 100) via any of SRBs 0 to 2. The above-described PDCCH and PDSCH may be transmitted in a master Cell Group (MCG) between the UE (terminal device 200) and the Master gNodeB (base station 100). In addition to or instead of this, the above-described base station 100 may be a gNB Central Unit (gNB-CU) or a gNB Distributed Unit (gNB-DU) or a combination of gNB-CU and gNB-DU (i.e. gNB). The gNB-CU hosts the RRC layer, SDAP layer, and PDCP layer for a certain UE. On the other hand, gNB-DU hosts the RLC layer, MAC layer, and PHY layer for a certain UE. That is, a part or all of the above-described RRC signaling may be terminated between the UE and gNB-CU via gNB-DU. A part or all of the downlink RRC signaling may be generated by gNB-CU. On the other hand, the above-described PDCCH and PDSCH may be generated by gNB-DU and transmitted to the UE. In addition to or instead of this, the base station 100 may be implemented as a macro eNB, a small eNB, or the like. The small eNB may be an eNB that covers cells smaller than the macro cell, such as a pico eNB, a micro eNB, or a home (femto) eNB. In addition to or instead of this, the base station 100 may be implemented as other types of base station such as Node B or a Base Transceiver Station (BTS). The base station 100 may include a main body (also referred to as a base station device) that controls radio communication, and one or more Remote Radio Heads (RRHs) arranged at a location different from the main body. Furthermore, various types of terminals, which will be described below, may operate as the base station 100 by temporarily or semi-permanently executing the base station function.

Furthermore, for example, the terminal device 200 may be implemented as a mobile terminal such as a smartphone, a tablet Personal Computer (PC), a notebook PC, a portable game terminal, a portable/dongle type mobile router, and a digital camera, or as an in-vehicle terminal such as a car navigator. Furthermore, the terminal device 200 may be implemented as a terminal (also referred to as a Machine Type Communication (MTC) terminal) that performs Machine To Machine (M2M) communication. Furthermore, the terminal device 200 may be a radio communication module (for example, an integrated circuit module formed of one die) mounted on these terminals.

4.1. Application Examples Related to Base Station

First Application Example

Figure 22:
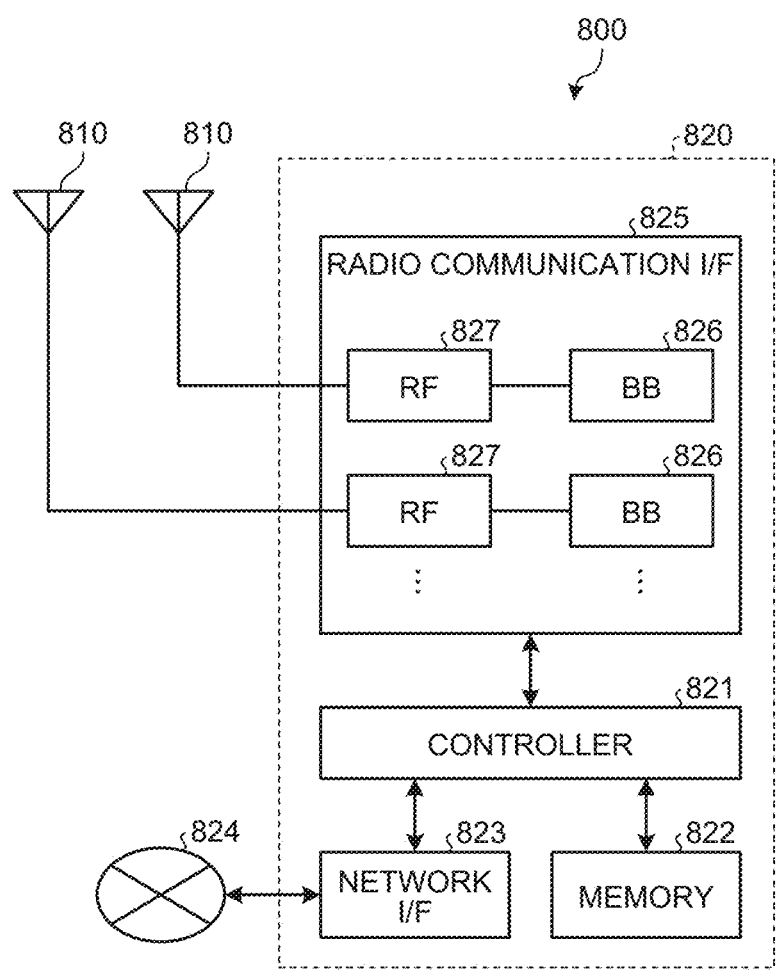
FIG. 22 is a block diagram illustrating a first example of a schematic configuration of a gNB to which the technology according to the present disclosure is applicable.

FIG. 22 is a block diagram illustrating a first example of a schematic configuration of a gNB to which the technology according to the present disclosure is applicable. A gNB 800 has one or more antennas 810 and a base station device 820. Each of the antennas 810 and the base station device 820 may be connected to each other via an RF cable. The technique of the present disclosure may be applied to eNB instead of gNB.

Each of the antennas 810 has a single or a plurality of antenna elements (for example, a plurality of antenna elements constituting a MIMO antenna) and is used for transmission and reception of radio signals by the base station device 820. The gNB 800 has a plurality of antennas 810 as illustrated in FIG. 22, and the plurality of antennas 810 may each correspond to a plurality of frequency bands used by the gNB 800, for example. Although FIG. 22 illustrates an example in which the gNB 800 has the plurality of antennas 810, the gNB 800 may have a single antenna 810.

The base station device 820 includes a controller 821, memory 822, a network interface 823, and a radio communication interface 825.

The controller 821 may be a CPU or DSP, for example, and controls operation of various functions of an upper layer of the base station device 820. For example, the controller 821 generates a data packet from the data in the signal processed by the radio communication interface 825 and transfers the generated packet via the network interface 823. The controller 821 may generate a bundled packet by bundling data from a plurality of baseband processors and transfer the generated bundled packet. In addition, the controller 821 may include logical functions that execute controls such as radio resource control, radio bearer control, mobility management, admission control, or scheduling. Furthermore, the control may be executed in cooperation with surrounding gNBs or core network nodes. The memory 822 includes RAM and ROM, and stores a program executed by the controller 821 and various types of control data (for example, terminal list, transmission power data, and scheduling data)

The network interface 823 is a communication interface for connecting the base station device 820 to a core network 824. The controller 821 may communicate with a core network node or other gNBs via the network interface 823. In that case, the gNB 800 may be connected to the core network node or other gNBs to each other by a logical interface (for example, an S1 interface or an X2 interface). The network interface 823 may be a wired communication interface or a radio communication interface for a radio backhaul. When the network interface 823 is a radio communication interface, the network interface 823 may use a frequency band higher than the frequency band used by the radio communication interface 825, for radio communication.

The radio communication interface 825 supports a cellular communication scheme such as NR, LTE, or LTE-Advanced, and provides a radio connection to terminals located in cells of gNB 800 via the antenna 810. The radio communication interface 825 can typically include a baseband (BB) processor 826, RF circuit 827, or the like. The BB processor 826 may perform, for example, encoding/decoding, modulation/demodulation, and multiplexing/demultiplexing, and executes various types of signal processing in individual layers (for example, L1, Medium Access Control (MAC), Radio Link Control (RLC), and Packet Data Convergence Protocol (PDCP)). The BB processor 826 may include some or all of the above-described logical functions instead of the controller 821. The BB processor 826 may be a module including: memory for storing a communication control program; a processor for executing the program; and related circuits. The functions of the BB processor 826 may be modified by updating the above program. Furthermore, the module may be a card or a blade inserted into a slot of the base station device 820, or may be a chip mounted on the card or the blade. The RF circuit 827 may include a mixer, a filter, an amplifier, or the like, and transmits and receives radio signals via the antenna 810.

The radio communication interface 825 may include a plurality of BB processors 826 as illustrated in FIG. 22, and the plurality of BB processors 826 may each correspond to a plurality of frequency bands used by the gNB 800, for example. Furthermore, the radio communication interface 825 may include a plurality of RF circuits 827 as illustrated in FIG. 22, and the plurality of RF circuits 827 may each correspond to a plurality of antenna elements, for example. Although FIG. 22 illustrates an example in which the radio communication interface 825 includes a plurality of BB processors 826 and a plurality of RF circuits 827, the radio communication interface 825 may include a single BB processor 826 or a single RF circuit 827.

In the gNB 800 illustrated in FIG. 22, one or more components included in the control unit 140 described with reference to FIG. 10 may be implemented in the radio communication interface 825. Alternatively, at least some of these components may be implemented in the controller 821. As an example, the gNB 800 may be equipped with a module including a part or all of the radio communication interface 825 (for example, the BB processor 826) and/or the controller 821, and the module may be equipped with one or more of the above components. In this case, the module may store a program for causing the processor to function as the one or more components (in other words, a program for causing the processor to perform the operation of the one or more components) and may execute the program. As another example, the program causing the processor to function as the one or more of the above components may be installed in the gNB 800, and the radio communication interface 825 (for example, the BB processor 826) and/or the controller 821 may execute the program. As described above, the gNB 800, the base station device 820, or the above module may be provided as a device including the one or more components, and a program for causing the processor to function as the one or more components may be provided. Furthermore, a readable recording medium on which the above program is recorded may be provided. Furthermore, in the gNB 800 illustrated in FIG. 22, the communication unit 120 described with reference to FIG. 10 may be implemented in the radio communication interface 825 (for example, the RF circuit 827). Furthermore, the antenna unit 110 may be implemented in the antenna 810. Furthermore, the storage unit 130 may be implemented in the memory 822.

Second Application Example

Figure 23:
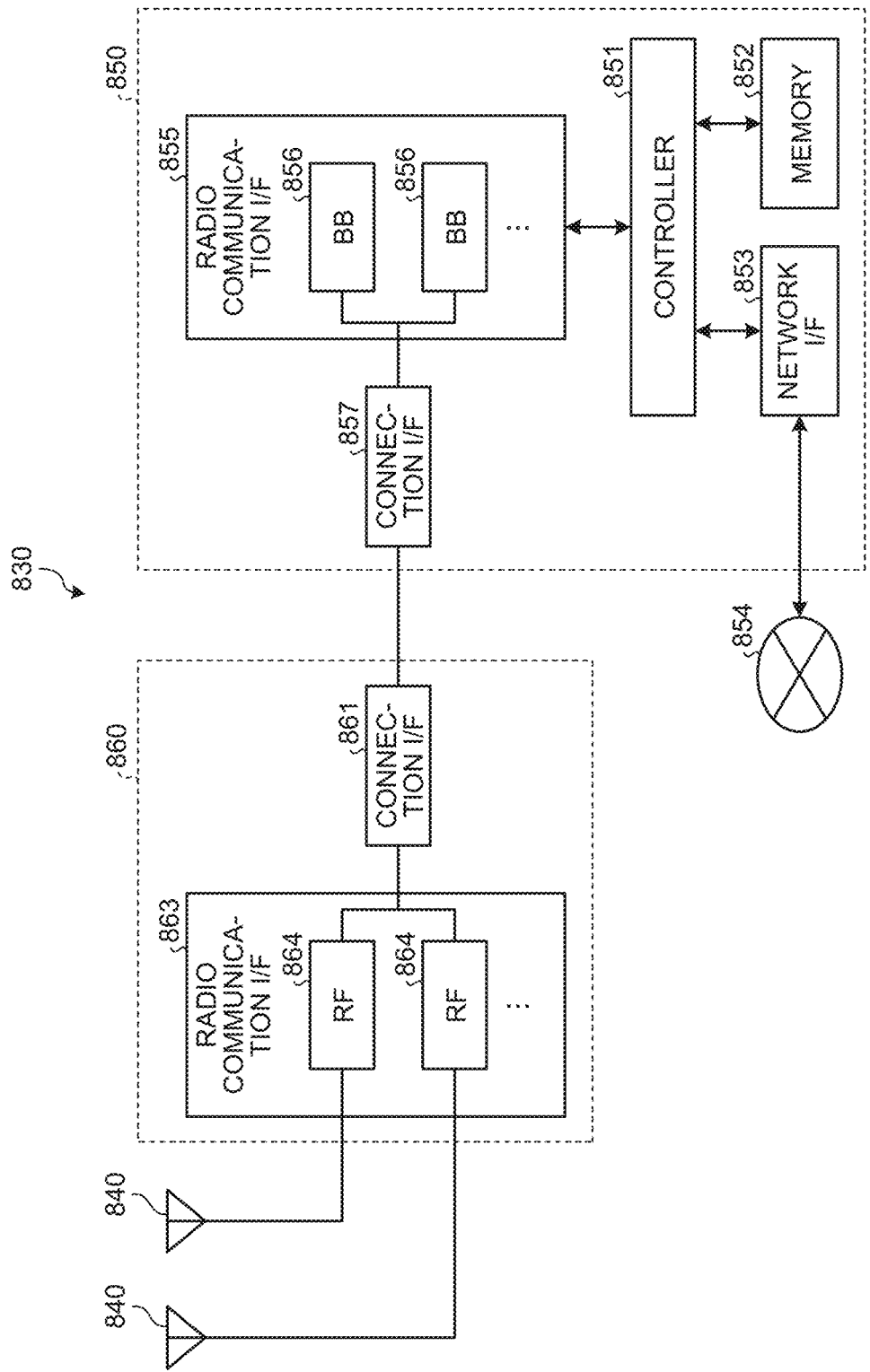
FIG. 23 is a block diagram illustrating a second example of a schematic configuration of a gNB to which the technology according to the present disclosure is applicable.

FIG. 23 is a block diagram illustrating a second example of a schematic configuration of a gNB to which the technology according to the present disclosure is applicable. A gNB 830 has one or more antennas 840, a base station device 850, and a gNB-DU 860. Each of the antennas 840 and the gNB-DU 860 may be connected to each other via an RF cable. Furthermore, the base station device 850 and the gNB-DU 860 can be connected to each other by a high-speed line such as an optical fiber cable. Incidentally, in a case where the technology of the present disclosure will be applied to eNB instead of gNB, the gNB-DU 860 will be replaced with RRH.

Each of the antennas 840 has a single or a plurality of antenna elements (for example, a plurality of antenna elements constituting a MIMO antenna) and is used for transmission and reception of radio signals by the gNB-DU 860. The gNB 830 has a plurality of antennas 840 as illustrated in FIG. 23, and the plurality of antennas 840 may each correspond to a plurality of frequency bands used by the gNB 830, for example. Although FIG. 23 illustrates an example in which the gNB 830 has the plurality of antennas 840, the gNB 830 may have a single antenna 840.

The base station device 850 includes a controller 851, a memory 852, a network interface 853, a radio communication interface 855, and a connection interface 857. The controller 851, the memory 852, and the network interface 853 are similar to the controller 821, memory 822, and network interface 823 described with reference to FIG. 20, respectively.

The radio communication interface 855 supports a cellular communication scheme such as NR, LTE, or LTE-Advanced, and provides a radio connection to terminals located in the sector corresponding to the gNB-DU 860 via the gNB-DU 860 and the antenna 840. The radio communication interface 855 can typically include a BB processor 856 or the like. The BB processor 856 is similar to the BB processor 826 described with reference to FIG. 22, except that connection to an RF circuit 864 of the gNB-DU 860 is made via the connection interface 857. The radio communication interface 855 may include a plurality of BB processors 856 as illustrated in FIG. 23, and the plurality of BB processors 856 may each correspond to a plurality of frequency bands used by the gNB 830, for example. Although FIG. 23 illustrates an example in which the radio communication interface 855 includes a plurality of BB processors 856, the radio communication interface 855 may include a single BB processor 856.

The connection interface 857 is an interface for connecting the base station device 850 (radio communication interface 855) to the gNB-DU 860. The connection interface 857 may be a communication module for communication over the high-speed line connecting the base station device 850 (radio communication interface 855) and the gNB-DU 860.

The gNB-DU 860 also includes a connection interface 861 and a radio communication interface 863.

The connection interface 861 is an interface for connecting the gNB-DU 860 (radio communication interface 863) to the base station device 850. The connection interface 861 may be a communication module for communication over the high-speed line.

The radio communication interface 863 transmits and receives radio signals via the antenna 840. The radio communication interface 863 can typically include the RF circuit 864 or the like. The RF circuit 864 may include a mixer, a filter, an amplifier, or the like, and transmits and receives radio signals via the antenna 840. The radio communication interface 863 includes a plurality of RF circuits 864 as illustrated in FIG. 23, and the plurality of RF circuits 864 may each correspond to a plurality of antenna elements, for example. Although FIG. 23 illustrates an example in which the radio communication interface 863 includes a plurality of RF circuits 864, the radio communication interface 863 may include a single RF circuit 864.

In the gNB 830 illustrated in FIG. 23, one or more components included in the control unit 140 described with reference to FIG. 10 may be implemented in the radio communication interface 855 and/or the radio communication interface 863. Alternatively, at least some of these components may be implemented in the controller 851. As an example, the gNB 830 may be equipped with a module including a part or all of the radio communication interface 855 (for example, the BB processor 856) and/or the controller 851, and the module may be equipped with one or more of the above components. In this case, the module may store a program for causing the processor to function as the one or more components (in other words, a program for causing the processor to perform the operation of the one or more components) and may execute the program. As another example, the program causing the processor to function as the one or more of the above components may be installed in the gNB 830, and the radio communication interface 855 (for example, the BB processor 856) and/or the controller 851 may execute the program. As described above, the gNB 830, the base station device 850, or the above module may be provided as a device including the one or more components, and a program for causing the processor to function as the one or more components may be provided. Furthermore, a readable recording medium on which the above program is recorded may be provided.

Furthermore, in the gNB 830 illustrated in FIG. 23, the communication unit 120 described with reference to FIG. 10, for example, may be implemented in the radio communication interface 863 (for example, the RF circuit 864). Furthermore, the antenna unit 110 may be implemented in the antenna 840. Furthermore, the storage unit 130 may be implemented in the memory 852.

4.2. Application Examples Related to Terminal Devices

First Application Example

Figure 24:
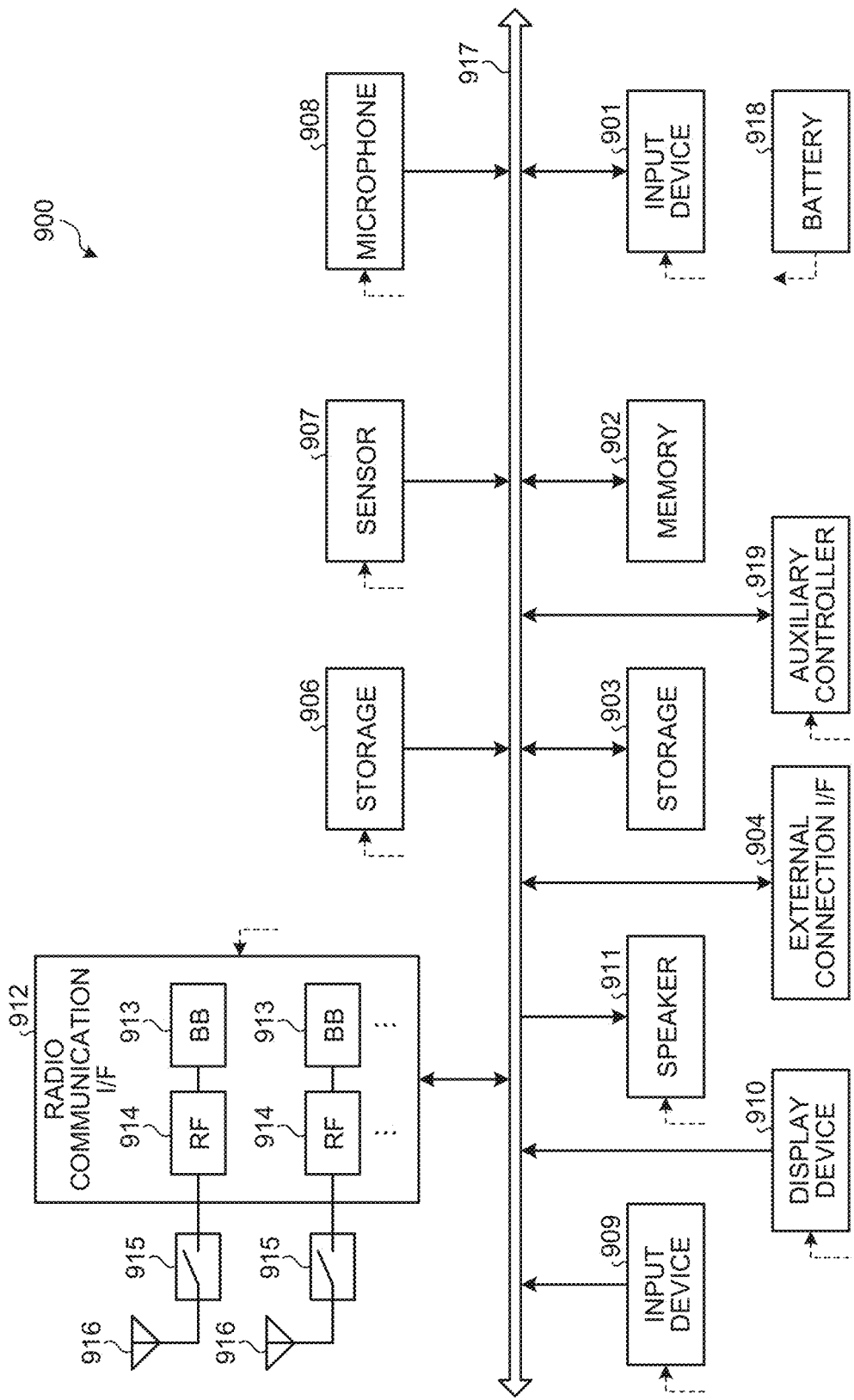
FIG. 24 is a block diagram illustrating an example of a schematic configuration of a smartphone to which the technology according to the present disclosure is applicable.

FIG. 24 is a block diagram illustrating an example of a schematic configuration of a smartphone 900 to which the technology according to the present disclosure can be applied. The smartphone 900 includes a processor 901, memory 902, storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be a CPU or a System on Chip (SoC), for example, and controls the functions of the application layer and other layers of the smartphone 900. The memory 902 includes RAM and ROM and stores programs to be executed by the processor 901, and data. The storage 903 may include a storage medium such as semiconductor memory or a hard disk. The external connection interface 904 is an interface for connecting an external device such as a memory card or a Universal Serial Bus (USB) device to the smartphone 900.

The camera 906 includes an imaging element such as a Charge Coupled Device (CCD) or a Complementary Metal Oxide Semiconductor (CMOS), and generates a captured image. Examples of the sensor 907 can include a group of sensors such as a positioning sensor, a gyro sensor, a geomagnetic sensor, and an acceleration sensor. The microphone 908 converts the voice input to the smartphone 900 into a voice signal. The input device 909 includes a touch sensor that detects a touch on the screen of the display device 910, a keypad, a keyboard, a button, or a switch and receives an input of operation or information from the user. The display device 910 has a screen such as a liquid crystal display (LCD) or an organic light emitting diode (OLED) display, and displays an output image of the smartphone 900. The speaker 911 converts the voice signal output from the smartphone 900 into voice.

The radio communication interface 912 supports a cellular communication scheme such as NR, LTE, or LTE-Advanced and executes radio communication. The radio communication interface 912 can typically include a BB processor 913, an RF circuit 914, or the like. The BB processor 913 may perform, for example, encoding/decoding, modulation/demodulation, and multiplexing/demultiplexing, and performs various signal processing for radio communication. The RF circuit 914 may include a mixer, a filter, an amplifier, or the like, and transmits and receives radio signals via the antenna 916. The radio communication interface 912 may be a one-chip module integrating the BB processor 913 and the RF circuit 914. The radio communication interface 912 may include a plurality of BB processors 913 and a plurality of RF circuits 914 as illustrated in FIG. 22. Although FIG. 22 illustrates an example in which the radio communication interface 912 includes a plurality of BB processors 913 and a plurality of RF circuits 914, the radio communication interface 912 may include a single BB processor 913 or a single RF circuit 914.

Furthermore, the radio communication interface 912 may support other types of radio communication scheme such as short-range radio communication scheme, near field radio communication scheme, or wireless Local Area Network (LAN) scheme in addition to the cellular communication scheme. In that case, the radio communication interface 912 may include the BB processor 913 and the RF circuit 914 for each of the radio communication schemes.

Each of the antenna switches 915 switches the connection destination of the antenna 916 between a plurality of circuits included in the radio communication interface 912 (for example, circuits for different radio communication schemes).

Each of the antennas 916 has a single or a plurality of antenna elements (for example, a plurality of antenna elements constituting a MIMO antenna) and is used for transmitting and receiving radio signals by the radio communication interface 912. The smartphone 900 may have a plurality of antennas 916 as illustrated in FIG. 24. Although FIG. 24 illustrates an example in which the smartphone 900 has the plurality of antennas 916, the smartphone 900 may have a single antenna 916.

Furthermore, the smartphone 900 may be provided with the antenna 916 for each of the radio communication schemes. In that case, the antenna switch 915 may be omitted from the configuration of the smartphone 900.

The bus 917 provides mutual connection between the processor 901, the memory 902, the storage 903, the external connection interface 904, the camera 906, the sensor 907, the microphone 908, the input device 909, the display device 910, the speaker 911, the radio communication interface 912, and the auxiliary controller 919. The battery 918 supplies power to individual blocks of the smartphone 900 illustrated in FIG. 24 via the power supply lines partially illustrated by the broken lines in the figure. The auxiliary controller 919 controls operation of minimum necessary functions of the smartphone 900 during a sleep mode, for example.

In the smartphone 900 illustrated in FIG. 24, one or more components included in the control unit 240 described with reference to FIG. 11 may be implemented in the radio communication interface 912. Alternatively, at least some of these components may be implemented in the processor 901 or the auxiliary controller 919. As an example, the smartphone 900 may be equipped with a module including a part (for example, the BB processor 913) or all of the radio communication interface 912, the processor 901, and/or the auxiliary controller 919, and may be equipped with one or more of the above-described components in the module. In this case, the module may store a program for causing the processor to function as the one or more components (in other words, a program for causing the processor to perform the operation of the one or more components) and may execute the program. As another example, the program causing the processor to function as the one or more of the above components may be installed in the smartphone 900, and the radio communication interface 912 (for example, the BB processor 913), the processor 901, and/or the auxiliary controller 919 may execute the program. As described above, the smartphone 900 or the above module may be provided as a device including the one or more components, and a program for causing the processor to function as the one or more components may be provided. Furthermore, a readable recording medium on which the above program is recorded may be provided.

Furthermore, in the smartphone 900 illustrated in FIG. 24, for example, the communication unit 220 described with reference to FIG. 11 may be implemented in the radio communication interface 912 (for example, the RF circuit 914). Furthermore, the antenna unit 210 may be implemented in the antenna 916. Furthermore, the storage unit 230 may be implemented in the memory 902.

Second Application Example

Figure 25:
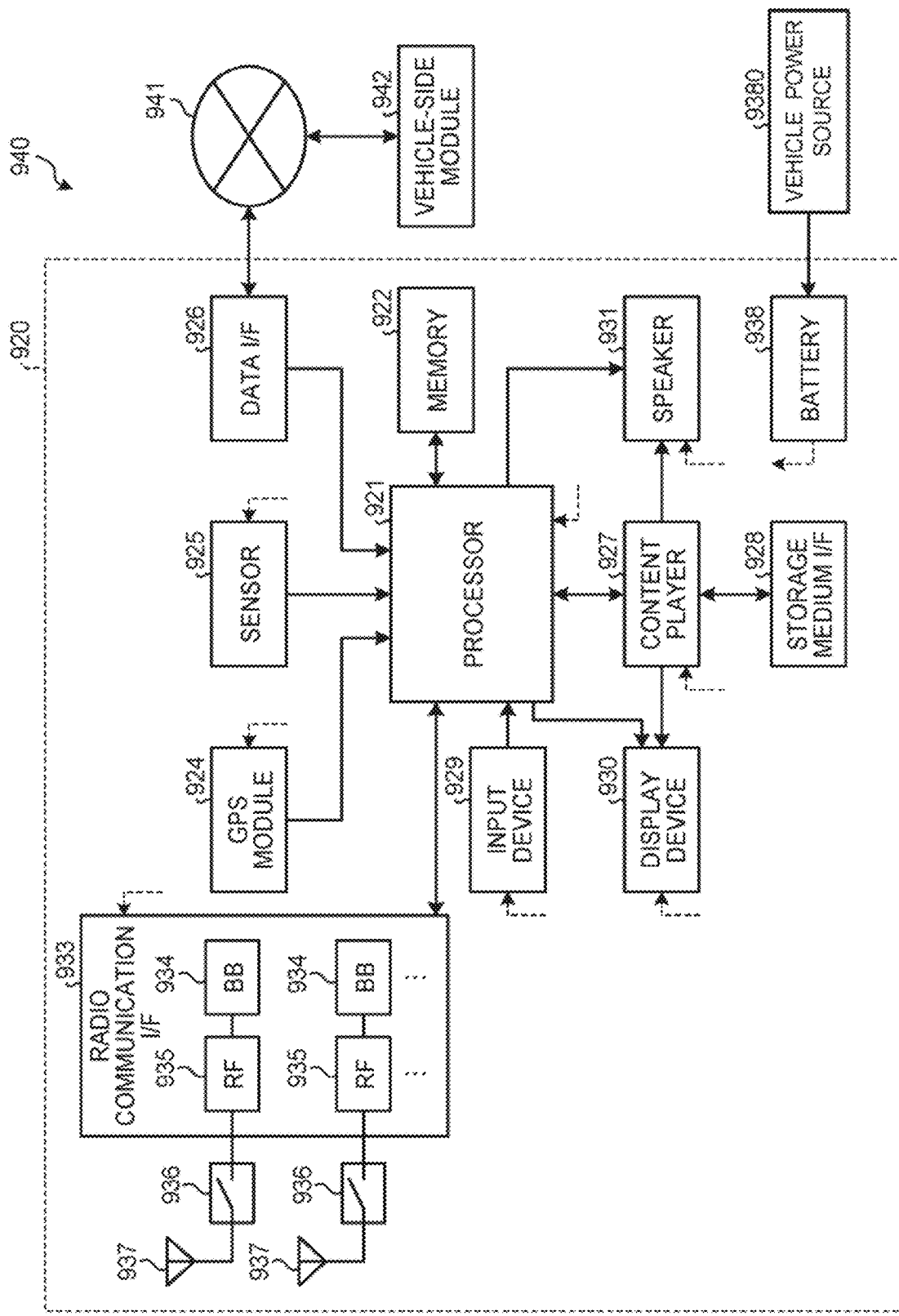
FIG. 25 is a block diagram illustrating an example of a schematic configuration of a car navigator to which the technology according to the present disclosure is applicable.

FIG. 25 is a block diagram illustrating an example of a schematic configuration of a car navigator 920 to which the technology according to the present disclosure is applicable. The car navigator 920 includes a processor 921, memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be a CPU or SoC, for example, and controls the navigation function and other functions of the car navigator 920. The memory 922 includes RAM and ROM and stores programs to be executed by the processor 921, and data.

The GPS module 924 measures the position (including latitude, longitude, and altitude) of the car navigator 920 using GPS signals received from GPS satellites. The sensor 925 can include a group of sensors such as a gyro sensor, a geomagnetic sensor, and a barometric pressure sensor, for example. The data interface 926 is connected to an in-vehicle network 941 via a terminal (not illustrated), for example, and acquires data generated on the vehicle side such as vehicle speed data.

The content player 927 plays pieces of content stored on a storage medium (for example, a CD or DVD) inserted into the storage medium interface 928. The input device 929 includes a touch sensor that detects a touch on the screen of the display device 930, a button, or a switch and receives an input of operation or information from the user. The display device 930 includes a screen such as an LCD or OLED display and displays an image of a navigation function or a content to be played. The speaker 931 outputs the sound of the navigation function or the content to be played.

The radio communication interface 933 supports a cellular communication scheme such as NR, LTE, or LTE-Advanced and executes radio communication. The radio communication interface 933 can typically include a BB processor 934, an RF circuit 935, or the like. The BB processor 934 may perform, for example, encoding/decoding, modulation/demodulation, and multiplexing/demultiplexing, and performs various signal processing for radio communication. The RF circuit 935 may include a mixer, a filter, an amplifier, or the like, and transmits and receives radio signals via the antenna 937. The radio communication interface 933 may be a one-chip module integrating the BB processor 934 and the RF circuit 935. The radio communication interface 933 may include a plurality of BB processors 934 and a plurality of RF circuits 935 as illustrated in FIG. 25. Although FIG. 25 illustrates an example in which the radio communication interface 933 includes a plurality of BB processors 934 and a plurality of RF circuits 935, the radio communication interface 933 may include a single BB processor 934 or a single RF circuit 935.

Furthermore, the radio communication interface 933 may support other types of radio communication schemes such as short-range radio communication scheme, near field radio communication scheme, or a wireless LAN scheme in addition to the cellular communication scheme. In that case, the radio communication interface 933 may include the BB processor 934 and the RF circuit 935 for each of the radio communication schemes.

Each of the antenna switches 936 switches the connection destination of the antenna 937 between a plurality of circuits included in the radio communication interface 933 (for example, circuits for different radio communication schemes).

Each of the antennas 937 has a single or a plurality of antenna elements (for example, a plurality of antenna elements constituting a MIMO antenna) and is used for transmitting and receiving radio signals by the radio communication interface 933. The car navigator 920 may have a plurality of antennas 937 as illustrated in FIG. 25. Although FIG. 25 illustrates an example in which the car navigator 920 has a plurality of antennas 937, the car navigator 920 may have a single antenna 937.

Furthermore, the car navigator 920 may include the antenna 937 for each of the radio communication schemes. In that case, the antenna switch 936 may be omitted from the configuration of the car navigator 920.

The battery 938 supplies power to individual blocks of the car navigator 920 illustrated in FIG. 23 via the power supply lines partially illustrated by the broken lines in the figure. In addition, the battery 938 stores electric power supplied by vehicle power source 9380 from the vehicle side.

In the car navigator 920 illustrated in FIG. 25, one or more components included in the control unit 240 described with reference to FIG. 11 may be implemented in the radio communication interface 933. Alternatively, at least some of these components may be implemented in the processor 921. As an example, the car navigator 920 may be equipped with a module including a part (for example, the BB processor 934) or all of the radio communication interface 933 and/or the processor 921, and the module may be equipped with one or more of the above components. In this case, the module may store a program for causing the processor to function as the one or more components (in other words, a program for causing the processor to perform the operation of the one or more components) and may execute the program. As another example, a program causing the processor to function as one or more of the above components may be installed in the car navigator 920, and the radio communication interface 933 (for example, the BB processor 934) and/or the processor 921 may execute the program. As described above, the car navigator 920 or the above module may be provided as a device including the one or more components, and a program for causing the processor to function as the one or more components may be provided. Furthermore, a readable recording medium on which the above program is recorded may be provided.

Furthermore, in the car navigator 920 illustrated in FIG. 25, the communication unit 220 described with reference to FIG. 11, for example, may be implemented in the radio communication interface 933 (for example, the RF circuit 935). Furthermore, the antenna unit 210 may be implemented in the antenna 937. Furthermore, the storage unit 230 may be implemented in the memory 922.

Furthermore, the technology according to the present disclosure may be actualized as an in-vehicle system (or vehicle) 940 including one or more blocks of the car navigator 920 described above, the in-vehicle network 941, and a vehicle-side module 942. The vehicle-side module 942 generates vehicle-side data such as vehicle speed, engine speed, or failure information, and outputs the generated data to the in-vehicle network 941.

5. Modifications

A control device that controls the base station device 100 or the terminal device 200 of the present embodiment may be actualized by a dedicated computer system or a general-purpose computer system.

For example, a communication program for executing the above-described operations (for example, a transmission/reception process) is stored in a computer-readable recording medium such as an optical disk, semiconductor memory, a magnetic tape, or a flexible disk and distributed. For example, the program is installed on a computer and the above processes are executed to achieve the configuration of the control device. At this time, the control device may be a base station device or a device external to the terminal device (for example, a personal computer). Furthermore, the control device may be a base station device or a device inside the terminal device.

Furthermore, the communication program may be stored in a disk device included in a server device on a network such as the Internet so as to be downloadable to a computer, for example. Furthermore, the functions described above may be implemented by using operating system (OS) and application software in cooperation. In this case, the sections other than the OS may be stored in a medium for distribution, or the sections other than the OS may be stored in a server device so as to be downloadable to a computer, for example.

Furthermore, among individual processes described in the above embodiments, all or a part of the processes described as being performed automatically may be manually performed, or the processes described as being performed manually can be performed automatically by known methods. In addition, the processing procedures, specific names, and information including various data and parameters illustrated in the above documents or drawings can be arbitrarily changed unless otherwise specified. For example, various types of information illustrated in each of drawings are not limited to the information illustrated.

In addition, each of components of each of devices illustrated is provided as a functional and conceptional illustration and thus does not necessarily need to be physically configured as illustrated. That is, the specific form of distribution/integration of each of devices is not limited to those illustrated in the drawings, and all or a part thereof may be functionally or physically distributed or integrated into arbitrary units according to various loads and use conditions.

Furthermore, the above-described embodiments can be appropriately combined within a range implementable without contradiction of processes. Furthermore, the order of individual steps illustrated in the flowchart and the sequence diagram in the embodiment can be changed as appropriate.

Although in the above-described embodiment, defaults of combinations of the receiving antenna panel and the receiving beam (reception environment) to be used by the terminal device 200 have been described, the "receiving antenna panel" does not have to be explicitly considered in one aspect. As an example, when one receiving beam has been received and measured by a plurality of different receiving antenna panels, it may be recognized (considered) as a plurality of different receiving beams from the viewpoint (UE perspective) of the UE (terminal device 200). In this case, the above-described "defaults of the combinations (reception environment) of the receiving antenna panel and the receiving beam to be used by the terminal device 200" may be replaced with "the defaults of the receiving beam to be used by the terminal device 200".

In addition to or instead of this, the association between the resource area of the control information (e.g. PDCCH) and the identification information (e.g. SSB-Index) (or the combination of the receiving antenna panel and the receiving beam) described above may be set for per the terminal device 200 (UE), MAC entity in the UE, cell, CC, or BWP.

6. Summary

As described above, according to one embodiment of the present disclosure, the communication device (for example, the terminal device 200) according to the present embodiment includes the plurality of antenna panels, the antenna unit 210 (reception unit), the selection unit 241, and the setting unit 244. The antenna unit 210 receives one or a plurality of reference signals from the base station 100 via the plurality of antenna panels. The selection unit 241 selects one or more receiving beams from among the received one or more reference signals. The setting unit 244 sets the combination of the receiving antenna panel and the receiving beam used by the terminal device 200 when receiving one or more pieces of control information transmitted from the base station 100, based on the combination of the receiving antenna panel and the receiving beam used in the reception of the one or more reference signals.

This makes it possible to appropriately set the default of the reception environment (combination of the receiving antenna panel and the receiving beam).

Furthermore, the terminal device 200 according to the embodiment further includes the acquisition unit 243. The acquisition unit 243 acquires association information in which the resource area corresponding to the combination of the receiving antenna panel and the receiving beam to be used by the terminal device 200 when receiving the control information is associated with identification information for specifying the combination of the receiving antenna panel and the receiving beam used at the reception of the reference signal. Furthermore, based on the association information acquired by the acquisition unit 243, the setting unit 244 sets the combination of the receiving antenna panel and the receiving beam to be used by the terminal device when receiving the control information.

This makes it possible to easily specify the reference signal for setting the reception environment.

Furthermore, as the identification information according to the embodiment, the association information associated with the groove identification information that identifies the group each including the plurality of reference signals is acquired.

This makes it possible to easily specify the reference signal for setting the reception environment.

Moreover, the identification information according to the embodiment is signal identification information that identifies the reference signal having the highest reception power at the time of synchronization among the plurality of reference signals included in each of groups.

This makes it possible to easily specify the reference signal for setting the reception environment. Moreover, due to high reception power, it is possible to set a high-quality reception environment.

In addition, the communication device according to the embodiment further includes the reporting unit 242. The reporting unit 242 reports the reference signal selected by the selection unit 241 to the base station 100. The identification information is the report information reported by the reporting unit 242 to the base station 100.

This makes it possible to easily specify the reference signal for setting the reception environment.

Furthermore, the identification information according to the embodiment is signal identification information that identifies the reference signal selected by the selection unit 241.

This makes it possible to easily specify the reference signal for setting the reception environment.

Furthermore, the acquisition unit 243 of the communication device according to the embodiment acquires the association information in which the identification information is associated with the resource area in the order of appearance of the reference signals.

This enables the terminal device 200 to set the reception environment between the base station 100 and the communication device without using signaling that associates the resource area with the reference signal.

Furthermore, the acquisition unit 243 of the communication device according to the embodiment acquires the association information in which the identification information is associated with the resource area in accordance with the reception power of the reference signals.

This enables the terminal device 200 to set the reception environment between the base station 100 and the communication device without using signaling that associates the resource area with the reference signal.

Furthermore, in a case where there is no designation regarding the combination of the receiving antenna panel and the receiving beam to be used by the terminal device 200 when receiving the control information from the base station 100, the setting unit 244 of the communication device according to the embodiment sets the combination of the receiving antenna panel and the receiving beam to be used by the terminal device 200 when receiving the control information based on the association information.

This makes it possible to set an appropriate reception environment even with no designation regarding the reception environment from the base station 100.

Furthermore, the setting unit 244 of the communication device according to the embodiment sets the combination of the receiving antenna panel and the receiving beam to be used by the terminal device 200 when receiving the user information designated by the control information, based on the combination of the receiving antenna panel and the receiving beam used by the terminal device 200 at reception of the control information.

This makes it possible to appropriately set the default of the reception environment for receiving the user information.

Furthermore, when there is no designation regarding the combination of the receiving antenna panel and the receiving beam used by the terminal device 200 when receiving the user information from the base station 100, the setting unit 244 of the communication device according to the embodiment sets the combination of the receiving antenna panel and the receiving beam used by the terminal device 200 when receiving the user information based on the combination of the receiving antenna panel and the receiving beam used by the terminal device 200 at reception of the control information.

This makes it possible to set an appropriate reception environment even with no designation regarding the reception environment from the base station 100.

Furthermore, based on the identification information in the association information acquired by the acquisition unit 243, the setting unit 244 of the communication device according to the embodiment sets the combination of the receiving antenna panel and the receiving beam to be used by the terminal device 200 when receiving the user information designated by the control information.

As a result, even when the reception environment is not designated from the PDCCH, it is possible to use the default at the time of receiving the PDCCH, enabling setting an appropriate reception environment.

Furthermore, the acquisition unit 243 of the communication device according to the embodiment acquires the association information in which the plurality of pieces of identification information is associated with the resource area.

This makes it possible to ensure the diversity of the reception environment.

Furthermore, when the setting unit 244 of the communication device according to the embodiment cannot set the combination of the receiving antenna panel and the receiving beam to be used by the terminal device when receiving the user information designated by the control information based on the association information, the setting unit 244 sets the combination of the receiving antenna panel and the receiving beam to be used by the terminal device 200 when receiving the user information based on the signal transmitted from the base station 100.

This allows the terminal device 200 to set the reception environment when scheduling the PDSCH, making it possible to reliably set the reception environment in any situation.

Furthermore, the base station device 100 according to the embodiment includes the specifying unit 141, the generation unit 142, and the transmission unit 143. The specifying unit 141 specifies one or more receiving beams selected from one or more reference signals by the terminal device 200 that has received one or more reference signals transmitted from the base station device 100. The generation unit 142 generates the association information for associating the combination of the receiving antenna panel and the receiving beam to be used by the terminal device 200 when receiving one or more pieces of control information to be transmitted to the terminal device 200 with the combination of the receiving antenna panel and the receiving beam used by the terminal device 200 at reception of the reference signal.

This enables the terminal device 200 to appropriately set the default of the reception environment.

The embodiments of the present disclosure have been described above. However, the technical scope of the present disclosure is not limited to the above-described embodiments, and various modifications can be made without departing from the scope of the present disclosure. Moreover, it is allowable to combine the components across different embodiments and modifications as appropriate.

The effects described in individual embodiments of the present specification are merely examples, and thus, there may be other effects, not limited to the exemplified effects.

Note that the present technology can also have the following configurations.

(1)

A terminal device comprising:
 a plurality of antenna panels;
 a reception unit that receives one or more reference signals from a base station via the plurality of antenna panels;
 a selection unit that selects one or more receiving beams from among one or more received reference signals; and
 a setting unit that sets a combination of a receiving antenna panel and the receiving beam to be used by the terminal device when receiving one or more pieces of control information transmitted from the base station, based on a combination of the receiving antenna panel and the receiving beam used at the reception of the one or more reference signals.

(2)

The terminal device according to (1), further comprising:
 an acquisition unit that acquires association information in which a resource area corresponding to the combination of the receiving antenna panel and the receiving beam to be used by the terminal device when receiving the control information is associated with identification information for specifying the combination of the receiving antenna panel and the receiving beam used at the reception of the reference signal, wherein the setting unit sets the combination of the receiving antenna panel and the receiving beam to be used by the terminal device when receiving the control information, based on the association information.

(3)

The terminal device according to (2), wherein the identification information is group identification information that identifies groups each of which including a plurality of reference signals.

(4)

The terminal device according to (3), wherein the identification information is signal identification information that identifies the reference signal having a highest reception power at a time of synchronization among the plurality of reference signals included in each of the groups.

(5)

The terminal device according to any one of (2) to (4), further comprising a reporting unit that reports report information regarding the reference signal selected by the selection unit to the base station, wherein the identification information is the report information reported by the reporting unit to the base station.

(6)

The terminal device according to any one of (2) to (5), wherein the identification information is signal identification information that identifies the reference signal selected by the selection unit.

(7)

The terminal device according to any one of (2) to (6), wherein the acquisition unit acquires the association information in which the identification information is associated with the resource area in order of appearance of the reference signals.

(8)

The terminal device according to any one of (2) to (7), wherein the acquisition unit acquires the association information in which the identification information is associated with the resource area in accordance with reception power of the reference signal.

(9)

The terminal device according to any one of (2) to (8), wherein, in a case where there is no designation regarding the combination of the receiving antenna panel and the receiving beam to be used by the terminal device when receiving the control information from the base station, the setting unit sets the combination of the receiving antenna panel and the receiving beam to be used by the terminal device when receiving the control information, based on the association information.

(10)

The terminal device according to any one of (1) to (9), wherein the setting unit sets the combination of the receiving antenna panel and the receiving beam to be used by the terminal device when receiving user information designated by the control information, based on the combination of the receiving antenna panel and the receiving beam used by the terminal device at the reception of the control information.

(11)

The terminal device according to any one of (1) to (10), wherein, in a case where there is no designation of the combination of the receiving antenna panel and the receiving beam to be used by the terminal device when receiving user information designated by control information from the base station, the setting unit sets the combination of the receiving antenna panel and the receiving beam to be used by the terminal device when receiving the user information, based on the combination of the receiving antenna panel and the receiving beam used by the terminal device at the reception of the control information.

(12)

The terminal device according to any one of (2) to (11), wherein the setting unit sets the combination of the receiving antenna panel and the receiving beam to be used by the terminal device when receiving user information designated by the control information, based on the association information.

(13)

The terminal device according to any one of (2) to (12), wherein the acquisition unit acquires the association information in which a plurality of pieces of identification information is associated with the resource area.

(14)

The terminal device according to any one of (2) to (13), wherein, when the setting unit cannot set the combination of the receiving antenna panel and the receiving beam to be used by the terminal device when receiving user information designated by the control information based on the association information, the setting unit sets the combination of the receiving antenna panel and the receiving beam to be used by the terminal device when receiving the user information, based on a signal transmitted from the base station.

(15)

A base station device comprising:

a specifying unit that specifies one or more receiving beams selected from among one or more reference signals by a terminal device that has received the one or more reference signals transmitted from the base station device; and a generation unit that generates association information for associating a combination of a receiving antenna panel and the receiving beam to be used by the terminal device when receiving one or more pieces of control information to be transmitted to the terminal device, with a combination of the receiving antenna panel and the receiving beam used by the terminal device at the reception of the reference signal.

(16)

A communication method to be executed by a terminal device equipped with a plurality of antenna panels, the communication method comprising:

a reception step of receiving one or more reference signals from a base station via the plurality of antenna panels;

a selection step of selecting one or more receiving beams from among one or more received reference signals; and a setting step of setting a combination of a receiving antenna panel and the receiving beam to be used by the terminal device when receiving one or more pieces of control information transmitted from the base station, based on a combination of the receiving antenna panel and the receiving beam used at the reception of the one or more reference signals.

(17)

A control method to be executed by a base station device, the control method comprising:

a specifying step of specifying one or more receiving beams selected from among one or more reference signals by a terminal device that has received the one or more reference signals transmitted from the base station device; and a generation step of generating association information for associating a combination of a receiving antenna panel and the receiving beam to be used by the terminal device when receiving one or more pieces of control information to be transmitted to the terminal device, with a combination of the receiving antenna panel and the receiving beam used by the terminal device at the reception of the reference signal.

REFERENCE SIGNS LIST

1 COMMUNICATION SYSTEM
100 BASE STATION DEVICE (BASE STATION)
200 TERMINAL DEVICE

The invention claimed is:

1. A terminal device comprising:
a plurality of antennas; and
circuitry configured to:
 receive one or more reference signals from a base station via the plurality of antennas;
 select one or more receiving beams corresponding to the one or more reference signals received from the base station; and
 set reception environment information to be used by the terminal device for receiving one or more pieces of control information to be transmitted from the base station, based on reception environment information used to receive the one or more reference signals,
wherein the reception environment information comprises information about a combination of a receiving antenna panel and a receiving beam to be used by the terminal device for receiving one or more pieces of control information to be transmitted from the base station based on a combination of the receiving antenna panel and the receiving beam used to receive the one or more reference signals,
wherein the circuitry is further configured to:
acquire association information in which a resource area corresponding to the combination of the receiving antenna and the receiving beam to be used by the terminal device when receiving the control information is associated with identification information for specifying the combination of the receiving antenna and the receiving beam used at the reception of the reference signal, and
 set the combination of the receiving antenna and the receiving beam to be used by the terminal device when receiving the control information, based on the association information.

2. The terminal device according to claim 1, wherein the identification information is group identification information that identifies groups each of which including a plurality of reference signals.

3. The terminal device according to claim 2, wherein the identification information is signal identification information that identifies the reference signal having a highest reception power at a time of synchronization among the plurality of reference signals included in each of the groups.

4. The terminal device according to claim 1, wherein the circuitry is further configured to:
report information regarding the selected reference signal to the base station,
wherein the identification information is the report information.

5. The terminal device according to claim 1, wherein the identification information is signal identification information that identifies the selected reference signal.

6. The terminal device according to claim 1, wherein the circuitry is further configured to acquire the association information in which the identification information is associated with the resource area in order of appearance of the reference signals.

7. The terminal device according to claim 1, wherein the circuitry is further configured to acquire the association information in which the identification information is associated with the resource area in accordance with reception power of the reference signal.

8. The terminal device according to claim 1, wherein, in a case where there is no designation regarding the combination of the receiving antenna and the receiving beam to be used by the terminal device when receiving the control information from the base station, the circuitry is further configured to set the combination of the receiving antenna and the receiving beam to be used by the terminal device when receiving the control information, based on the association information.

9. The terminal device according to claim 1, wherein the circuitry is further configured to set the combination of the receiving antenna and the receiving beam to be used by the terminal device when receiving user information designated by the control information, based on the combination of the receiving antenna and the receiving beam used by the terminal device at the reception of the control information.

10. The terminal device according to claim 1, wherein, in a case where there is no designation of the combination of the receiving antenna and the receiving beam to be used by the terminal device when receiving user information designated by control information from the base station, the circuitry is further configured to set the combination of the receiving antenna and the receiving beam to be used by the terminal device when receiving the user information, based on the combination of the receiving antenna and the receiving beam used by the terminal device at the reception of the control information.

11. The terminal device according to claim 1, wherein the circuitry is further configured to set the combination of the receiving antenna and the receiving beam to be used by the terminal device when receiving user information designated by the control information, based on the association information.

12. The terminal device according to claim 1, wherein the circuitry is further configured to acquire the association information in which a plurality of pieces of identification information is associated with the resource area.

13. The terminal device according to claim 1, wherein, based on the circuitry being unable to set the combination of the receiving antenna and the receiving beam to be used by the terminal device when receiving user information designated by the control information based on the association information, the circuitry sets the combination of the receiving antenna and the receiving beam to be used by the terminal device when receiving the user information, based on a signal transmitted from the base station.

14. The terminal device according to claim 1, wherein the circuitry is configured to receive the one or more pieces of control information from the base station via the set combination of the receiving antenna of the plurality of antennas and the receiving beam.

15. A base station device comprising:
a transceiver; and
circuitry configured to:
specify one or more receiving beams selected from among one or more reference signals by a terminal device that has received the one or more reference signals transmitted from the base station device;
generate association information for associating a combination of a receiving antenna and a receiving beam to be used by the terminal device to receive one or more pieces of control information that is to be transmitted to the terminal device, with a combination of a receiving antenna and a receiving beam used by the terminal device for the reception of the one or more reference signals; and
transmit the association information to the terminal device.

16. A communication method to be executed by a terminal device equipped with a plurality of antenna, the communication method comprising:
receiving one or more reference signals from a base station via the plurality of antennas;
selecting one or more receiving beams corresponding to the one or more reference signals received from the base station; and
setting reception environment information to be used by the terminal device for receiving one or more pieces of control information to be transmitted from the base station, based on reception environment information used to receive the one or more reference signals,
wherein the reception environment information comprises information about a combination of a receiving antenna panel and a receiving beam to be used by the terminal device for receiving one or more pieces of control information to be transmitted from the base station based on a combination of the receiving antenna panel and the receiving beam used to receive the one or more reference signals,
wherein the method further comprises:
acquiring association information in which a resource area corresponding to the combination of the receiving antenna and the receiving beam to be used by the terminal device when receiving the control information is associated with identification information for specifying the combination of the receiving antenna and the receiving beam used at the reception of the reference signal, and
setting the combination of the receiving antenna and the receiving beam to be used by the terminal device when receiving the control information, based on the association information.

17. A control method to be executed by a base station device, the control method comprising:
specifying one or more receiving beams selected from among one or more reference signals by a terminal device that has received the one or more reference signals transmitted from the base station device;
generating association information for associating a combination of a receiving antenna and a receiving beam to be used by the terminal device to receive one or more pieces of control information that is to be transmitted to the terminal device, with a combination of a receiving antenna and a receiving beam used by the terminal device for the reception of the one or more reference signals; and
transmitting the association information to the terminal device.

* * * * *